(12) United States Patent
Marshall et al.

(10) Patent No.: US 10,307,794 B2
(45) Date of Patent: Jun. 4, 2019

(54) SCREEN ASSEMBLY FOR A VIBRATING SCREENING MACHINE

(71) Applicant: FP CanMechanica, Inc, Calgary (CA)

(72) Inventors: Dale R. Marshall, Calgary (CA); Daniel Guy Pomerleau, Calgary (CA)

(73) Assignee: FP CanMechanica, Inc, Calgary (CA)

( * ) Notice: Subject to any disclaimer, the term of this patent is extended or adjusted under 35 U.S.C. 154(b) by 0 days.

(21) Appl. No.: 15/540,462

(22) PCT Filed: Dec. 23, 2015

(86) PCT No.: PCT/CA2015/051372
§ 371 (c)(1),
(2) Date: Jun. 28, 2017

(87) PCT Pub. No.: WO2016/106450
PCT Pub. Date: Jul. 7, 2016

(65) Prior Publication Data
US 2018/0001351 A1    Jan. 4, 2018

Related U.S. Application Data

(60) Provisional application No. 62/098,529, filed on Dec. 31, 2014.

(51) Int. Cl.
*B07B 1/46*    (2006.01)
*B01D 33/03*    (2006.01)

(52) U.S. Cl.
CPC ............ *B07B 1/4663* (2013.01); *B01D 33/03* (2013.01); *B07B 1/46* (2013.01); *B07B 1/469* (2013.01);

(Continued)

(58) Field of Classification Search
CPC ....... B07B 1/46; B07B 1/4663; B07B 1/4618; B07B 1/4645

(Continued)

(56) References Cited

U.S. PATENT DOCUMENTS 4,486,302 A * 12/1984 Jorgensen ............. B07B 1/4645
209/397
5,385,669 A * 1/1995 Leone, Sr. ........... B01D 29/012
209/319

(Continued)

FOREIGN PATENT DOCUMENTS

WO    WO2016106450    12/2015

OTHER PUBLICATIONS

PCT International Search Report, PCT/CA2015/051372, dated Mar. 14, 2016.

(Continued)

*Primary Examiner* — Terrell H Matthews
(74) *Attorney, Agent, or Firm* — Patent Law Works LLP

(57) ABSTRACT

According to one aspect there is provided a screen assembly for a vibrating screening machine. The screen assembly comprises a screen chassis and a screen for screening material such as a solution containing liquid and solids. The screen chassis comprises a first face and a second face opposite to the first face, the screen chassis defining a plurality of openings therethrough from the first face to the second face for allowing passage of a material that has been screened. The screen is attached to the first face of the screen chassis and covering the openings of the screen chassis at the first face. The screen chassis may be made of a light-weight, stiff material. The screen may be made of a durable material such as metal. A method for making a screen assembly is also provided.

27 Claims, 26 Drawing Sheets

(52) U.S. Cl.
CPC .......... *B07B 1/4618* (2013.01); *B07B 1/4645* (2013.01); *B07B 1/4672* (2013.01); *B07B 2201/04* (2013.01)

(58) Field of Classification Search
USPC .................................................. 209/399, 403
See application file for complete search history.

(56) References Cited

U.S. PATENT DOCUMENTS

| | | | | |
|---|---|---|---|---|
| 6,241,098 | B1* | 6/2001 | Schulte | B07B 1/4627 |
| | | | | 209/397 |
| 6,439,392 | B1* | 8/2002 | Baltzer | B01D 33/0376 |
| | | | | 209/405 |
| 6,662,952 | B2* | 12/2003 | Adams | B01D 33/0376 |
| | | | | 209/319 |
| 6,769,550 | B2* | 8/2004 | Adams | B01D 29/012 |
| | | | | 209/399 |
| 9,403,192 | B2* | 8/2016 | Lipa | B07B 1/4618 |
| 2003/0132141 | A1 | 7/2003 | Adams et al. | |
| 2003/0136710 | A1 | 7/2003 | Adams et al. | |
| 2004/0149632 | A1* | 8/2004 | Schulte, Jr. | B01D 33/0376 |
| | | | | 209/405 |

OTHER PUBLICATIONS

PCT International Search Report and Written Opinion, PCT/CA2015/051372, dated Mar. 14, 2016.

\* cited by examiner

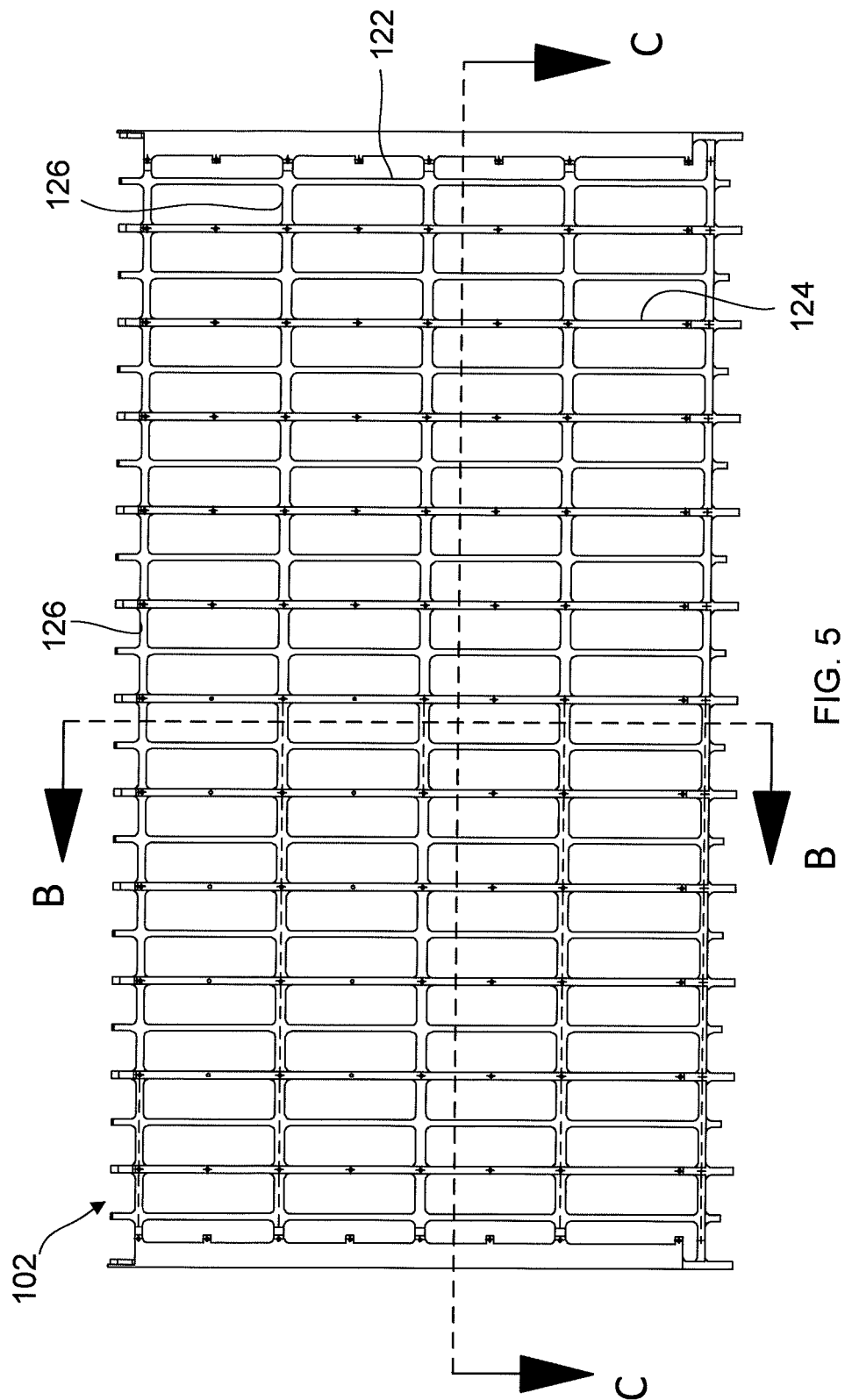

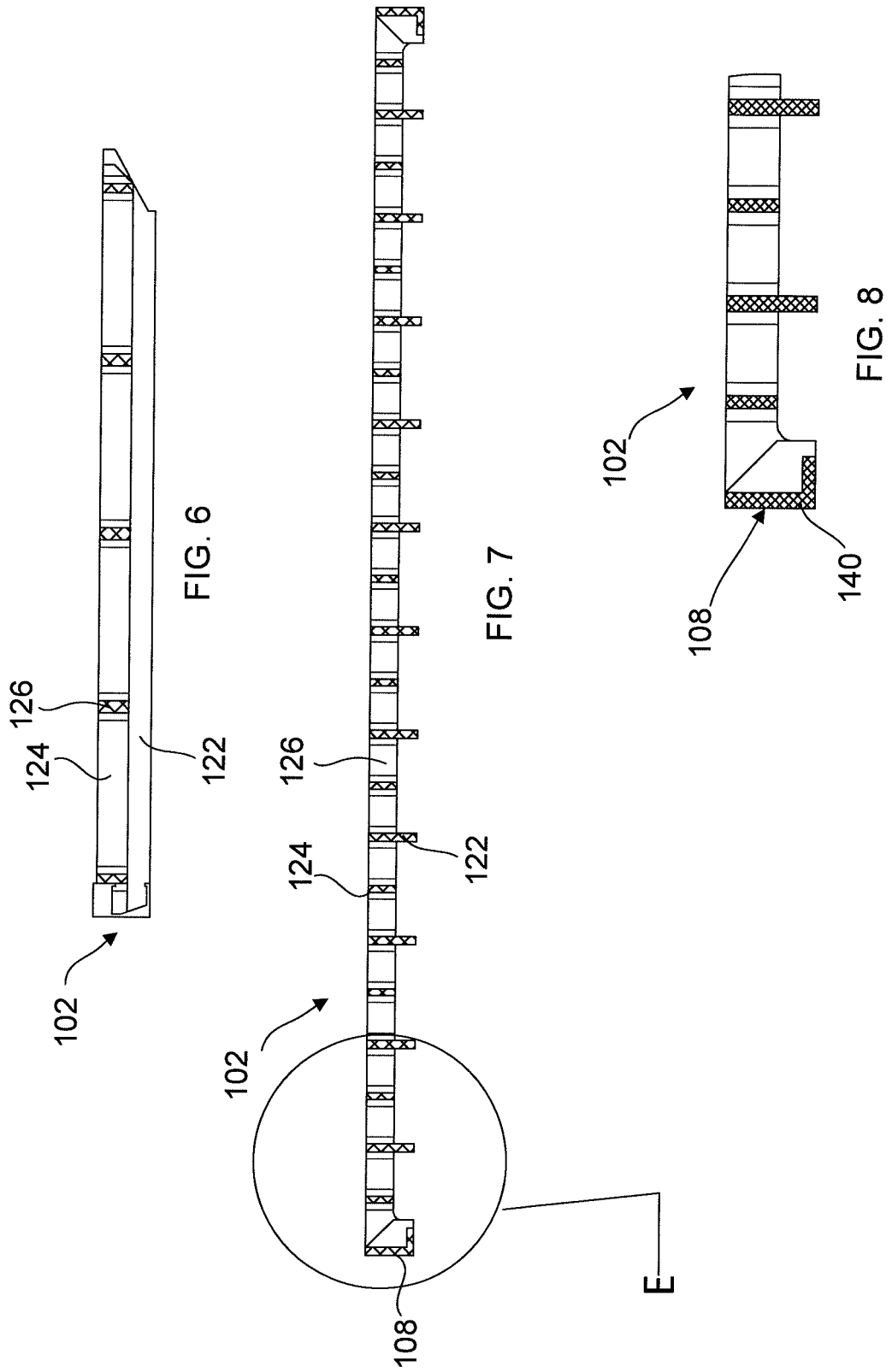

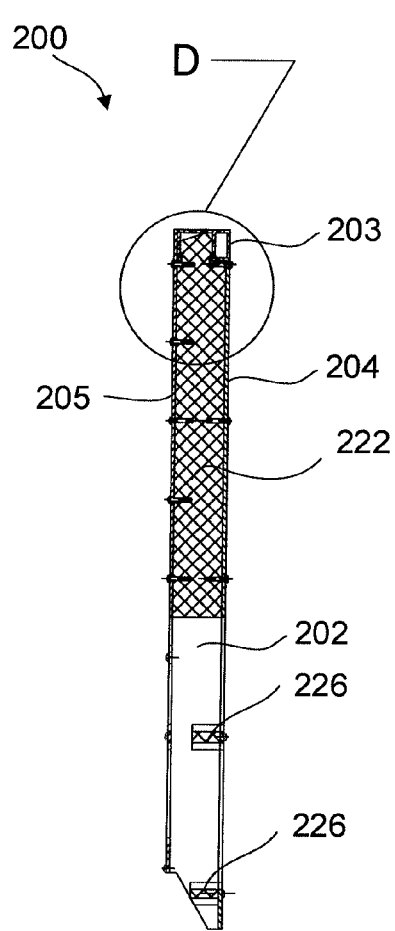
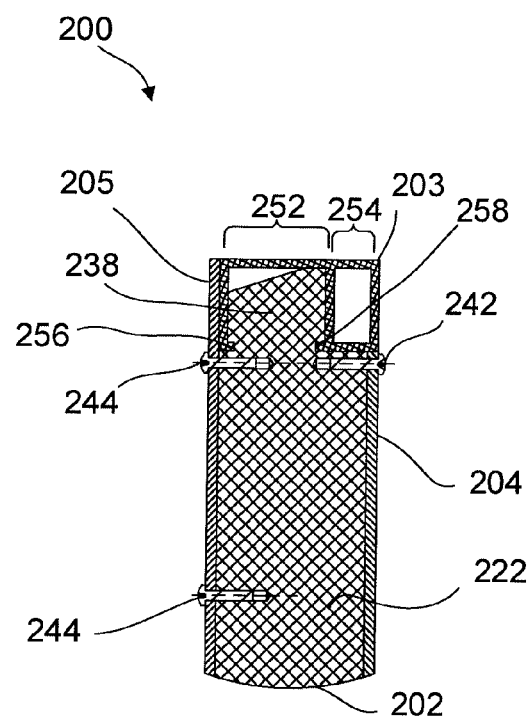
FIG. 13
FIG. 14

SCREEN ASSEMBLY FOR A VIBRATING SCREENING MACHINE

CROSS-REFERENCE TO RELATED APPLICATIONS

This application is a national phase entry under 35 U.S.C. § 371 of International Patent Application PCT/CA2015/051372, filed Dec. 23, 2015, designating the United States of America and published in English as International Patent Publication WO 2016/106450 A1 on Jul. 7, 2016, which claims the benefit under Article 8 of the Patent Cooperation Treaty to U.S. Provisional Patent Application Ser. No. 62/098,529, filed Dec. 31, 2014, the disclosure of each of which is hereby incorporated herein in its entirety by this reference.

FIELD OF THE DISCLOSURE

The present invention relates to vibrating screening systems for the separation of solids and fluids, particularly to screen assemblies for such systems.

BACKGROUND

Drilling and mineral extraction processes in various industries, including the mining and oil industries, often produce slurries of solids and liquids that must be separated from one another. Screening machines are used to separate such solids and liquids. For example, screen assemblies (such as shaker screen assemblies) may be used to separate drill cuttings from drilling fluid. A screening machine typically includes a screen bed, comprised of individual screen assemblies, over which a material (e.g. slurry or another solution) containing fluids and solids is passed, and which is then subjected to various separation forces including gravity and shaking.

However, as the combined weight of screen assemblies and the material loaded on a screening machine increases, the g-force provided by the screening machine to the material decreases in an apparently linear relationship. Furthermore, as the g-force at the center of the screen increases, the center of the screen may oscillate at a rate higher than the oscillation rate of the vibrating machine, which in turn may increase the rate of wear of the screen assembly. For example, such oscillations in the center of the screen assembly may cause a metal mesh of the screen to wear out at an increased rate. Therefore it is desirable to use lighter screen assemblies to reduce the direct loading of the screening machine and allow for a more optimized performance.

Conventional screen assemblies may be partially composed of plastic (such as polyurethane), but such conventional screen modules typically show little or no weight decrease over conventional metal screen modules. Such modules generally include metal tubing that is combined with plastic, in order to provide a structure with enough rigidity to overcome inertial issues when the screen module is subjected to frequency, amplitude, and mass forces present in a vibrating screening machine.

Current fabrication techniques may be labour intensive, and thus expensive. The welding of conventional screen frames may be inherently prone to quality issues such as warping of the frame itself. Furthermore, conventional screen assemblies (e.g. including welded frames) may not be easily recyclable or reusable.

SUMMARY

According to one aspect, there is provided a screen assembly for a vibrating screening machine, the screen assembly comprising: a screen chassis comprising a first face and a second face opposite to the first face, the screen chassis defining a plurality of openings therethrough from the first face to the second face for allowing passage of a material that has been screened; a screen for screening the material, the screen being attached to the first face of the screen chassis and covering the openings of the screen chassis at the first face.

In some embodiments, the screen comprises a perforated plate.

In some embodiments, the perforated plate is formed from sheet metal.

In some embodiments, the screen comprises a frame and a screening layer, the frame defining at least one opening, the at least one opening at least partially overlaying the openings of the screen chassis, the frame being attached to the screen chassis, the screening layer covering the at least one opening of the frame.

In some embodiments, the screening layer comprises a mesh.

In some embodiments, said at least one opening of the frame comprises a plurality of openings that are aligned with the openings of the screen chassis.

In some embodiments, the screen comprises metal.

In some embodiments, the frame is formed from sheet metal.

In some embodiments, the screen chassis comprises one or more of: plastic; aluminum; steel; and a composite material.

In some embodiments, the screen chassis is formed by a molding process.

In some embodiments, the first face of the screen chassis faces substantially upward when the screen assembly is mounted in the vibratory screening machine.

In some embodiments, the screen chassis comprises a grid structure defining the plurality of openings in the screen chassis.

In some embodiments, the grid structure of the screen chassis comprises a plurality of ribs parallel to the first and second faces, and a plurality of cross ribs parallel to the first and second faces and perpendicular to the ribs.

In some embodiments, one or more of the ribs or cross ribs extend between the first face and the second face of the screen chassis.

In some embodiments, one or more of the ribs and cross ribs extend only part way from the first face of the screen chassis toward the second face.

In some embodiments, the frame of the screen comprises a grid structure that is aligned with the grid structure of the screen chassis.

In some embodiments, the screen assembly further comprises a second screen for screening the material, the second screen being attached to the second face of the screen chassis and covering the openings of the screen chassis at the second face.

In some embodiments, the second screen comprises: a second frame defining at least one opening; and a second mesh covering the at least one opening of the second frame.

In some embodiments, the screen chassis defines a plurality of channels allowing solids caught by the second screen to move through said channels.

In some embodiments, the screen assembly further comprises a second screen for screening the material, the second screen being attached to the second face of the screen chassis and covering the openings of the screen chassis at the second face, and said one or more of the ribs and cross ribs extending only part way from the first face of the screen chassis toward the second face allow passage thereunder of solids caught by the second screen, and said one or more of the ribs or cross ribs extending between the first face and the second face of the screen chassis form channels therebetween for passage of said solids caught by the second screen.

In some embodiments, the screen assembly further comprises at least one open side allowing said solids caught by the second screen to exit from of the at least one open side.

In some embodiments, the screen attached to the first face of the screen chassis has a first mesh size or perforation size, and the second screen has a second mesh size or perforation size.

In some embodiments, the first mesh size or perforation size is different than the second mesh size or perforation size.

In some embodiments, the first mesh size or perforation size is larger than the second mesh size or perforation size.

In some embodiments, the second screen is removably attached to the screen chassis such that the screen assembly has a single screen configuration in which the second screen is not attached to the screen assembly, and a dual screen configuration in which the second screen is attached to the screen assembly.

In some embodiments, a second screen is removably attachable to the second face of the screen chassis such that the second screen covers the openings of the screen chassis at the second face and such that the screen assembly has a single screen configuration in which the second screen is not attached to the screen assembly, and a dual screen configuration in which the second screen is attached to the screen assembly.

In some embodiments, the screen assembly further comprises a frame attached to the second face of the screen chassis, the frame attached to the second face defining at least one opening at least partially overlaying the openings of the screen chassis at the second face.

In some embodiments, the screen is removably attached to the screen chassis such that the screen or the screen chassis is replaceable.

In some embodiments, the screen chassis is a first screen chassis, and the screen assembly further comprises at least one additional screen chassis having openings therethrough, said first screen chassis and said at least one additional screen chassis being in a stacked formation with the openings of the first screen chassis being aligned with the openings of the at least one additional screen chassis, the screen assembly further comprising, for each pair of adjacent screen chassis, a respective additional screen, for screening the material, between said pair of adjacent screen chassis.

According to another aspect, there is provided a screen chassis for attaching to a screen and for use in a vibratory screening machine, the screen chassis comprising: a first face and a second face opposite to the first face, the screen chassis defining a plurality of openings therethrough from the first face to the second face for allowing passage of a material.

In some embodiments, the screen chassis comprises one or more of: plastic; aluminum; steel; and a composite material.

In some embodiments, the screen chassis comprises a grid structure defining said openings.

In some embodiments, the grid structure of the screen chassis comprises a plurality of ribs parallel to the first and second faces, and a plurality of cross ribs parallel to the first and second faces and perpendicular to the ribs.

In some embodiments, the screen chassis is removably attachable to a second screen at the second face of the screen chassis such that the second screen covers the openings of the screen chassis at the second face.

In some embodiments, the screen chassis is removably attachable to said screen such that the screen or the screen chassis is replaceable.

According to another aspect, there is provided a screen for attaching to a screen chassis and for screening a material, the screen chassis comprising openings, the screen comprising: a frame comprising a plurality of openings that align with the openings in the screen chassis when the screen is attached to the screen chassis; and a mesh for screening a material, the mesh covering the openings of the frame.

In some embodiments, the screen is removably attachable to the screen chassis such that the screen or the screen chassis is replaceable.

In some embodiments, the screen comprises metal.

In some embodiments, the screen is at least partially formed from sheet metal.

According to another aspect, there is provided a method of making a screen assembly comprising: providing a screen chassis, the screen chassis comprising a first face and a second face opposite to the first face, the screen chassis defining a plurality of openings therethrough from the first face to the second face for allowing passage of a material that has been screened; providing a screen for screening the material; and attaching the screen to the screen chassis such that the screen covers the openings in the screen chassis.

In some embodiments, providing the screen chassis comprises forming the chassis by a molding process.

In some embodiments, the screen comprises at least one of a frame and a perforated plate, and providing the screen comprises forming said at least one of the frame and the perforated plate by a sheet metal punching process.

In some embodiments, the method further comprises attaching a second screen to the second face of the screen chassis such that the screen covers the openings in the screen chassis at the second face.

In some embodiments, the second screen is removably attached to the second face of the screen chassis.

Other aspects and features of the present invention will become apparent to those ordinarily skilled in the art, upon review of the following description of example embodiments of the invention.

BRIEF DESCRIPTION OF THE DRAWINGS

The invention will now be described in greater detail with reference to the accompanying diagrams, in which:

FIG. 5 is a bottom plan view of the chassis of FIGS. 3 and 4;

FIG. 6 is a cross-section view of the chassis of FIG. 5, taken along the line B-B shown in FIG. 5

FIG. 7 is a cross-section view of the chassis of FIG. 5, taken along the ling C-C shown in FIG. 5;

FIG. 8 is an enlarged cross-section view of a portion of the chassis within circle E in FIG. 7;

FIG. 13 is a cross section view of the screen assembly of FIG. 12 taken along the line A-A shown in FIG. 12;

FIG. 14 is an enlarged view of the portion of the screen assembly within the circle D in FIG. 13;

DETAILED DESCRIPTION

Figure 1:
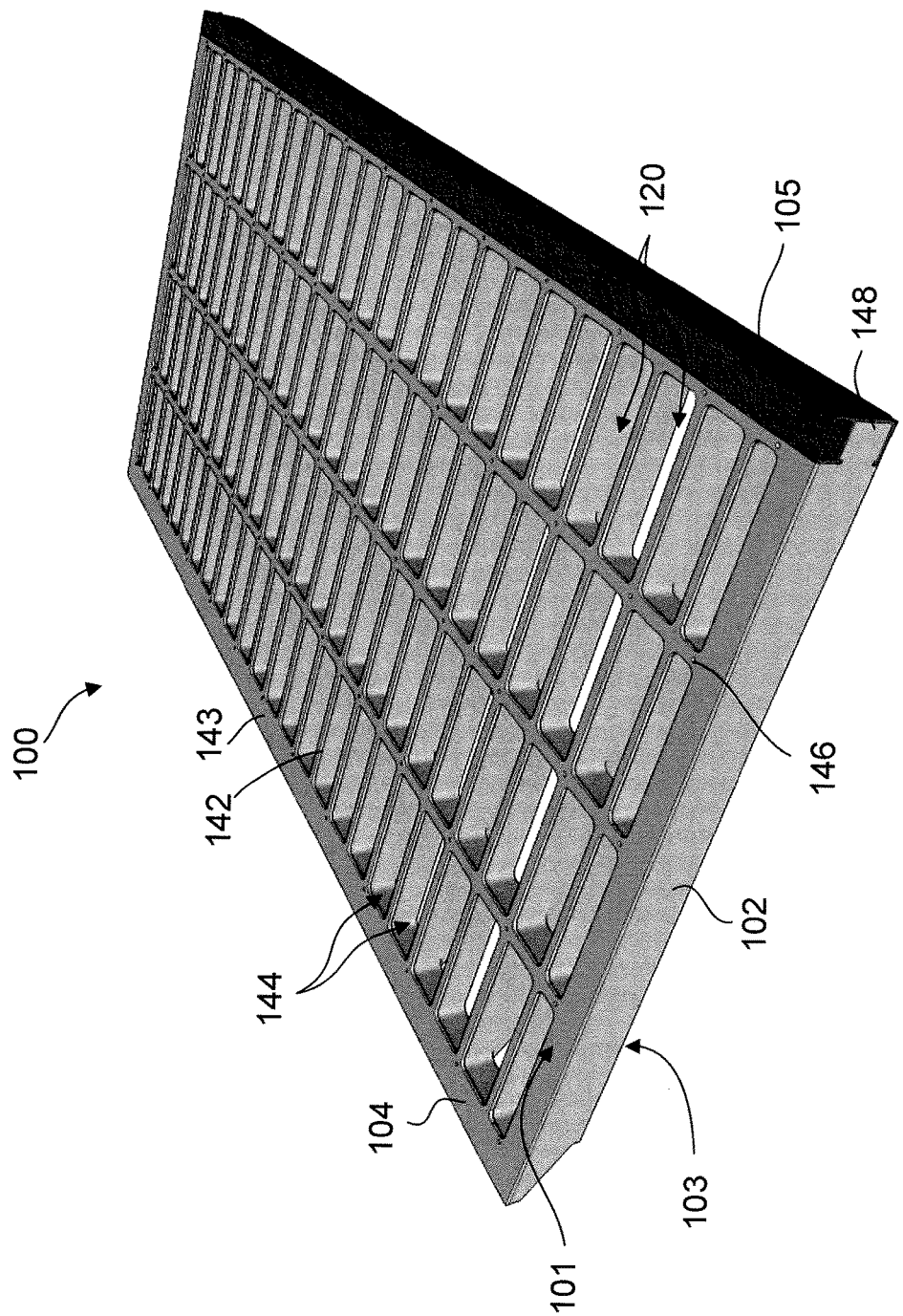
FIG. 1 is a top perspective view of a single screen assembly according to one embodiment.

According to some embodiments, there is provided a screen assembly (such as a shaker screen assembly) including a screen chassis to which is attached at least one screen for screening material (such as a solution or slurry containing solids and liquids). The screen chassis has a first face and a second face opposite to the first face, and the screen chassis defines a plurality of openings therethrough from the first face to the second face for allowing passage of the material (e.g. slurry) that has been screened. The screen is attached to the first face of the screen chassis and covers the openings of the screen chassis at the first face.

The screen may include a frame and a screening layer (e.g. a mesh) covering at least one opening in the frame. Alternatively, the screen may include a perforated plate and may not include a frame. The screen may be made at least partially formed of metal, such as sheet metal. For example the frame (or perforated plate) may be formed of sheet metal. A sheet metal perforated plate or frame for a screen may be substantially flat on a face of the chassis, or may also be folded over one or more sides of the chassis to add additional structural strength to the assembly. The screen may provide wear resistance for surfaces exposed to a material (e.g. a solution such as slurry) to be screened, while the chassis may be made of a light, stiff material to allow for a lightweight screen assembly. Such a design may reduce the weight of the screening screen assembly to as little as 30-50% of conventional modules currently in use which have frames made of metal and/or metal-tube-reinforced plastic.

The screen may, for example, be made from any metal that can withstand abrasion and wear by materials to be screened, including but not limited to steel and stainless steel. The metal screen may be at least partially formed from sheet metal. For example, a sheet metal punching process (e.g. using a CNC punch machine) may be used to make a perforated plate or a frame of the screen. In other embodiments, the screen is not made of metal. Other possible materials for the screen include, but are not limited to ceramics and plastics such as polyurethane. Embodiments are not limited to any particular material for the screen.

The screen chassis may comprise a hard, lightweight material such as hard plastic, aluminum, composite materials (e.g. carbon fiber), etc. For example, the chassis may be formed of a glass filled polypropylene, which may provide strength, temperature and chemical resistance for use in a vibratory screening machine. One possible glass filled polypropylene is a composite of polypropylene and glass fiber (e.g. 20% glass fiber). Other materials such as steel may also be used. Embodiments are not limited to any particular material for the screen chassis. The chassis may be formed by any known method, including but not limited to molding.

The screen may be attached to the screen chassis by any method known in the art, including but not limited to staking (e.g. heat staking) mechanical fasteners or chemical adhesives. Alternatively, the screen may be attached to the screen chassis during the molding process, for example by insert molding or overmolding. The screen may be removably attached such that the screen and/or the screen chassis is replacable.

In some embodiments, the chassis is molded and the screen (or the frame of the screen) is made by punching sheet metal. Production of a molded chassis and punched sheet metal may be machine automated and thus more controllable than a conventional process of welding a frame. This automated production may, therefore, reduce variability in the form and/or structural integrity of the screen assemblies. The screen and/or screen chassis may be replaceable, which may improve the potential for recycling and reusability of the screen assembly. For example, a screen may be removably attached to a screen chassis, and a single chassis may be thereby used with multiple different screens (e.g. the screens may be swappable). Similarly, a single screen may be used with multiple screen chassis.

The screen assemblies described herein may also possibly include ceramic materials (e.g. in the chassis and/or screen) to not only provide enhanced life but changes in the surface tension between the filtering material and the the fluids being separated.

The screen may have a grid-like frame and a mesh. The grid-like frame may define openings which are covered by the mesh. The frame and mesh of the screen may, for example, be metal. The metal mesh may be attached to the metal frame of the metal screen by an adhesive, including but not limited to epoxy. The screen chassis can have a grid-like frame so that openings in the grid align with the frame of the metal screen. The screen chassis can be attached to a single screen (e.g. metal screen) on one face of the grid, or can be attached to two screens (e.g. metal screens), each on opposite faces of the grid.

In use, the screen assembly may be oriented substantially horizontally, or at a slight angle to the horizontal, with the screen facing substantially upwards, so that the material (e.g. slurry) to be screened can fall onto the module to contact the screen. Larger solids may be retained by a mesh or perforated surface of the screen, and smaller solids will pass through the screen and through the openings in the grid of the plastic chassis under the influence of gravity. The term "mesh size" is used herein to denote the size of openings in the mesh. The term "perforation size" refers to the size of holes or openings in a perforated surface such as a perforated plate. Thus, the mesh size or perforation size determines the size of solids that can pass through the mesh or the perforated surface.

In a dual screen module in which two opposing faces of the screen chassis are each attached to a different screen, the screens can have the same or different mesh sizes or perforation sizes. The screen on the upper face of the module which first contacts the material or slurry to be screened may have a larger mesh size or perforation size, so as to screen out the largest solids and allow mid-size and smaller solids to pass through. The screen on the lower face of the module which contacts the material or slurry which passes through the upper screen may have a smaller mesh size or perforation size, so that it can selectively retain solids which are small enough to pass through the upper screen.

Figure 2:
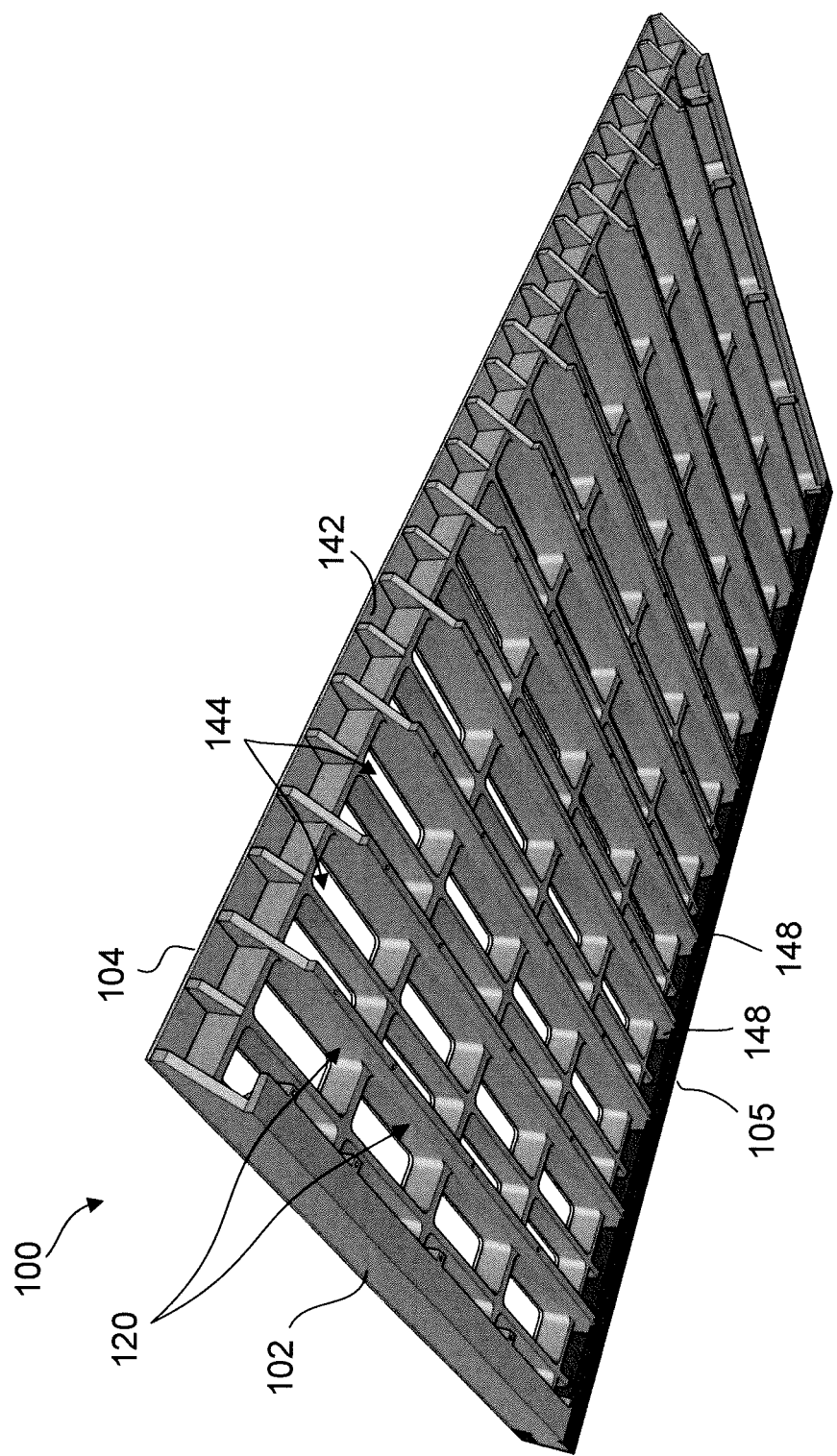
FIG. 2 is a bottom perspective view of the single screen assembly of FIG. 1.

FIGS. 1 and 2 are, respectively, top and bottom perspective views of a single screen assembly 100 according to one embodiment. The screen assembly 100 may, for example, be a shaker screen assembly for a vibrating screen machine. The screen assembly 100 includes a chassis 102 and a screen 104 attached thereto. The chassis 102 is made of hard plastic in this embodiment, although other materials (e.g. lightweight and stiff materials) may also be used as described above. The screen 104 in this embodiment is made of metal although other materials may be used for the screen in other embodiments, as described above. The metal screen 104 may be manufactured at least partially from sheet metal.

As will be explained in more detail below, the screen chassis 102 defines a plurality of openings 120 therethrough to allow passage of material that has been screened. The metal screen 104 includes a frame 142 that defines a plurality of openings 144, and a mesh (not shown) covers the openings 144. The openings 144 of the frame 142 are generally aligned to the openings 120 of the chassis 102. The openings 144 also have a size and shape that generally correspond to the openings 120 of the screen chassis 102, although the size and/or shape of openings in a frame may not correspond to the size and/or shape of individual openings of the screen chassis in other embodiments.

Turning again to FIGS. 1 and 2, the screen assembly 100 having the plastic chassis 102 may be lighter than conventional screen assemblies, but still be structurally suitable for use in vibrating screening machines. The screen assembly 100 may be used for separation of solids from a liquid (e.g. drill cuttings from drilling fluid), although embodiments are not limited to that particular application. For example, screen assemblies may also be used to separate different sizes of solids.

The screen assembly 100 has a generally rectangular shape with a rectangular top face 101 and a rectangular bottom face 103, wherein the top face 101 and the bottom face 103 are separated by a short distance. The distance between the top and bottom faces 101 and 103 may be referred to as the thickness of the screen assembly 100. The size and thickness of the screen assembly 100 may vary. For example, the screen assembly may be approximately 25 inches wide by 49 and ¼ inches long by 2 inches thick. However, other sizes may be used. For example, size may vary based on the application and/or machine for which the screen assembly is intended. Thickness may also vary, for example, based on the properties of the material(s) used in its composition, FEA requirements, the specification of the vibrating screening machine, the intended application, etc. In addition, non-rectangular screen assemblies could also be used.

Figure 3:
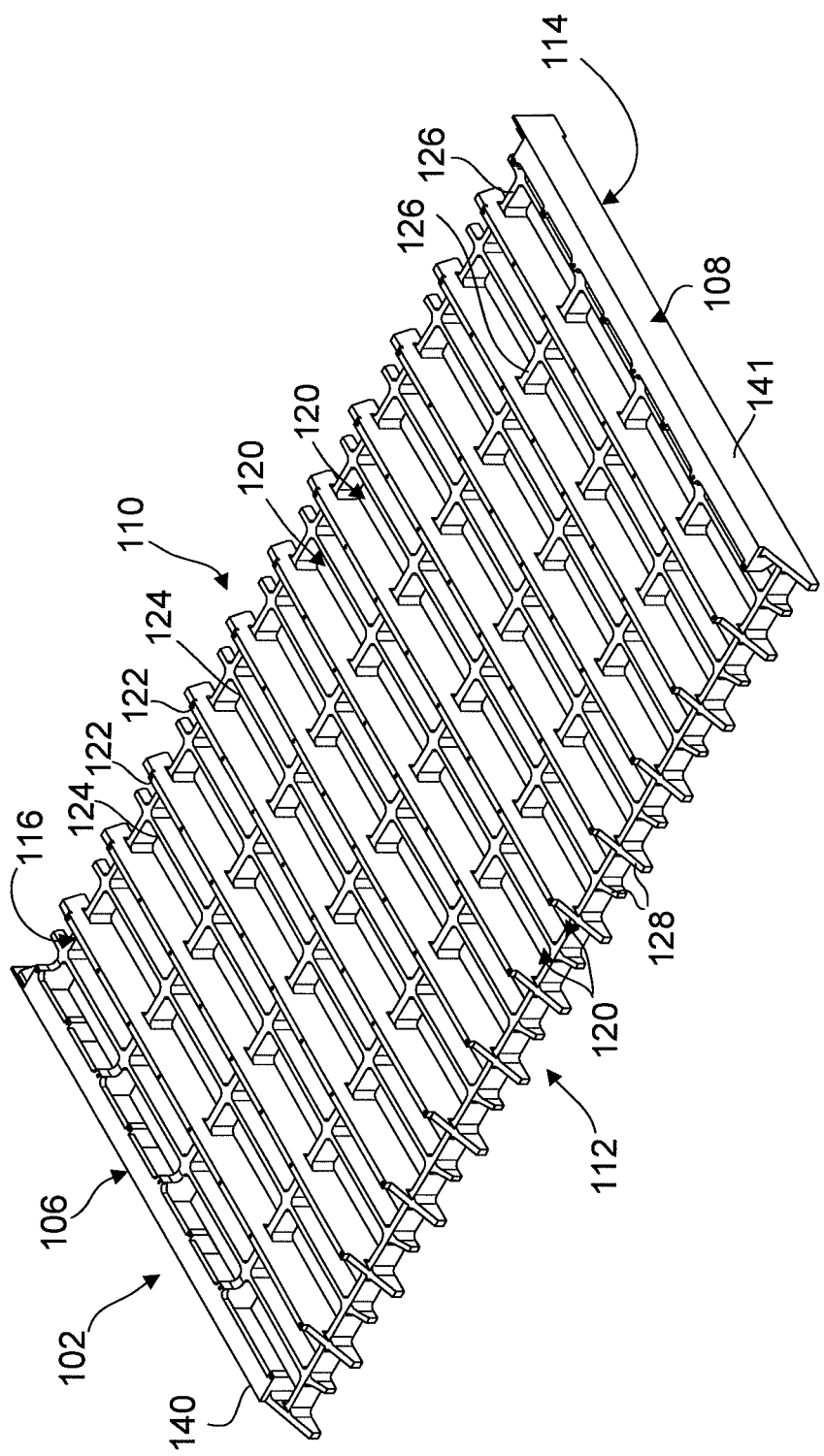
FIG. 3 is a bottom perspective view of a plastic chassis of the screen assembly shown in FIGS. 1 and 2.

FIG. 3 is a bottom perspective view of the plastic chassis 102 shown in FIGS. 1 and 2. The plastic chassis 102 has first and second opposite short sides 106 and 108, and first and second opposite long sides 110 and 112. The chassis 102 also has a first top face 114 and a second bottom face 116. The terms "top" and "bottom" are used for ease of reference herein and not to limit the orientation of the chassis 102. However, in normal operation, the top face 114 may face substantially upwards when the screen assembly 100 (shown in FIGS. 1 and 2) is mounted in a vibrating screen machine.

As seen in FIG. 3, the chassis defines a plurality of openings 120 therethrough, from the top face 114 to the bottom face 116, which allow material that has been screened to flow through the chassis 102. For ease of description, the direction parallel to the long sides 110 and 112 will be referred to as longitudinal, and the distance between the long sides 110 and 112 will be referred to as the width of the chassis 102. The direction parallel to the short sides 106 and 108 will be referred to as transverse, and the distance between the short sides 106 and 108 will be referred to as the length of the chassis 102. The distance between the top face 114 and the bottom face 116 of the chassis 102 will be referred to as the thickness of the chassis 102. Similar directions and dimensions will be used herein for other components and assemblies with similar rectangular shapes.

In this embodiment, the chassis 102 has a grid structure (between the four sides 106, 108, 110 and 112 of the chassis 102) that defines the openings 120 of the chassis 102. More specifically, the chassis 102 includes a plurality of equally spaced apart ribs 126 in the longitudinal direction and a plurality of equally spaced apart cross ribs 122 and 124 in the transverse direction. In this embodiment, the ribs 126 extend between the first and second short sides 106 and 108, and the cross ribs 122 and 124 extend between the first and second long sides 110 and 112. The ribs 126 and cross ribs 122 and 124 are parallel to the first face 114 and second face 116 of the chassis 102. The example ribs 126 and cross ribs 122 and 124 in this embodiment are in the form of plastic beams with cross-sectional profiles that are taller or deeper than they are wide. However, the shape and structure of ribs and cross ribs may vary.

The ribs 126 and cross ribs 122 and 124 alternate between full-depth cross ribs 122 and partial-depth cross ribs 124 (where "depth" refers to the vertical dimension of the cross ribs). The full-depth cross ribs 122 have a depth approximately equal to the thickness of the chassis 102 (i.e. extending from the top face 114 to the bottom face 116). The partial-depth cross ribs 124 on the other hand extend from the top face 114 and only part of the way toward the bottom face 116. The ribs 126 in this example also only extend part way from the top face 114 toward the bottom face 116. The short sides 106 and 108 of the chassis 102 act as additional cross ribs in the grid structure.

In this embodiment, each of the cross ribs 124 and 126 includes a tapered end 128 at the second long side 112 of the chassis, where the tapered ends 128 taper towards the top face 114 of the chassis. The tapered ends 128 together give the second long side a sloped, tapered shape such that the top face 114 is wider than the bottom face 116.

It is to be understood that the grid structure of the chassis 102, and the particular structure of the ribs 126 and cross ribs 122 and 124 is optional, and the structure of the chassis may vary in different embodiments. For example, rather than a grid of ribs and cross ribs, the chassis may define a plurality of round holes, or a plurality of long channels extending substantially between two sides of the chassis. Embodiments are not limited to a particular configuration of openings in the chassis. In the embodiment shown in FIG. 3, the first and second short sides 106 and 108 include first and second side walls 140 and 141 respectively. The chassis includes 23 cross ribs 122 and 124 total between the side walls 140 and 141, and five ribs 126 between the first and second long sides 110 and 112. The side walls 140 and 141 also function as cross ribs. The number of ribs and cross ribs in a grid structure, as well as the depth and thickness of the ribs and cross ribs may vary depending on the structural needs of the chassis and the material forming the chassis as well as other factors. The size and number of openings defined by the chassis may also vary. The specific embodiment shown in FIG. 3 is provided by way of example only.

Figure 4:
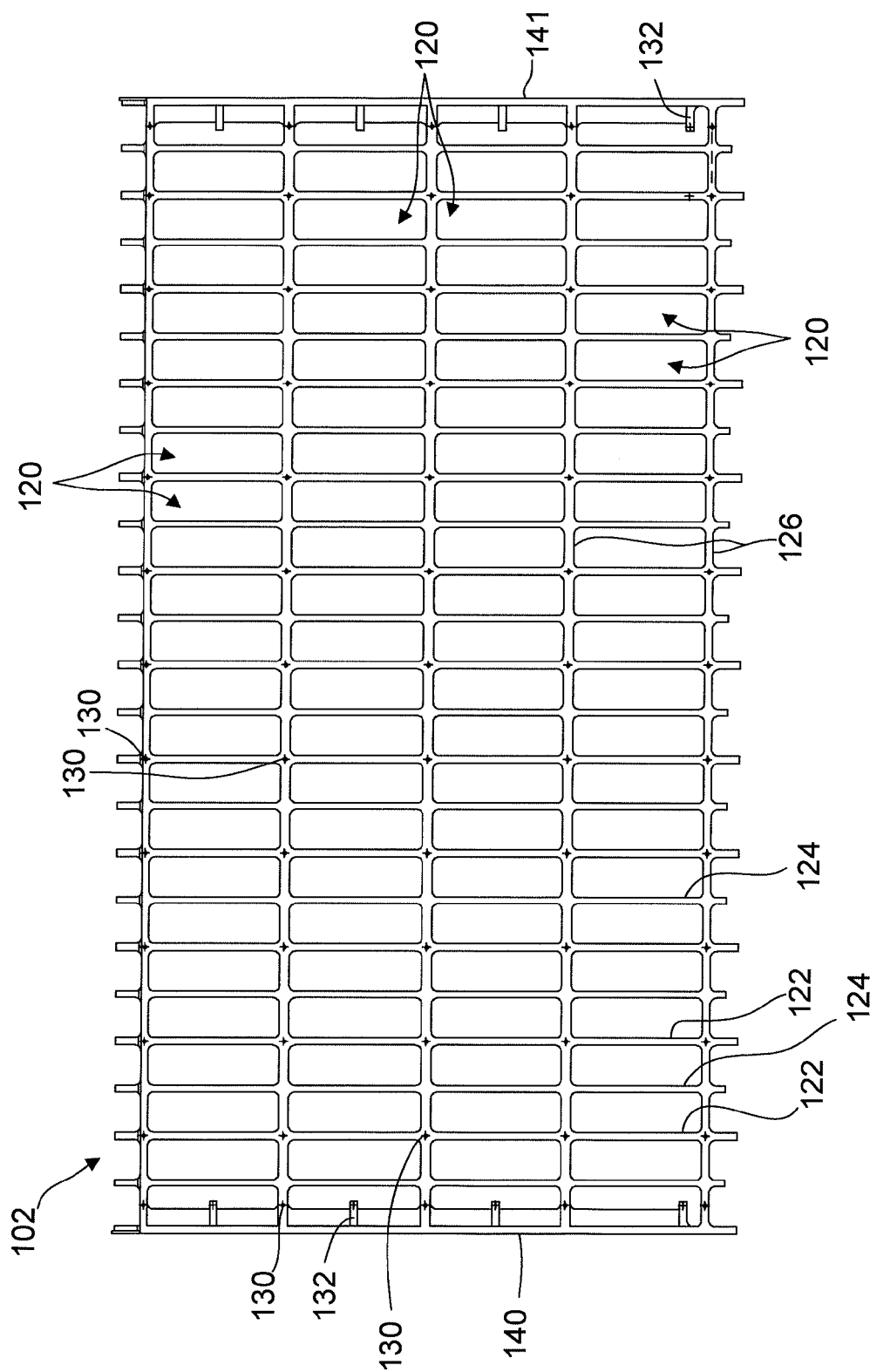
FIG. 4 is a top plan view of the chassis shown in FIG. 3.

FIG. 4 is a top plan view of the chassis 102 shown in FIGS. 1 to 3. FIG. 4 shows the cross ribs 122 and 124 and the ribs 126. The chassis 102 further includes a plurality of attachment points 130 distributed across the top face 114 of the chassis 102 for attaching the metal screen 104 (shown in FIG. 1). Several of the attachment points 130 are located at the intersection of the ribs 126 and cross ribs 122 and 124. Other attachment points 130 are near the short sides 106 and 108. Some of the attachment points 130 are provided on additional short ribs 132 that extend a short distance inward from the short sides 106 and 110.

The metal screen 104 may be attached to the chassis by mechanical means such as bolts, screws, rivets (e.g. plastic rivets), or using chemical adhesive or other means, at the attachment points 130. For example, the attachment points may be holes configured to accept and hold screws, or holes for a rivet or holes to accept a threaded insert to which a bolt or screw can be inserted, this would facilitate the re-use of the chassis to be refitted with a new screen. One possible means of mechanical attachment is staking, in which plastic bosses from the chassis would extend through corresponding holes in the metal screen. Heat, sonic and/or mechanical means would then be used to melt or punch the ends of the plastic bosses to deform the bosses and secure the screen to the chassis. Any suitable means may be used to attach the metal screen to the chassis, and the attachment points 130 are shown by way of example only. Openings 120 of the example chassis 102 are also visible in FIG. 4.

FIG. 5 is a bottom plan view of the plastic chassis 102, again showing ribs 126 and cross ribs 122 and 124.

FIG. 6 is a cross-section view of the chassis 102 taken along the line B-B shown in FIG. 5. FIG. 7 is a cross-section view of the chassis 102 taken along the line C-C shown in FIG. 5. The relative depths/heights of the full-depth ribs 122, the partial-depth ribs 124 and the ribs 126 are shown in FIGS. 6 and 7. In other embodiments, the cross ribs may all have a uniform depth, possibly extending the full thickness of the chassis. Having at least some partial-depth ribs (such as partial-depth ribs 124 in FIGS. 1 to 7) that do not extend all the way to the bottom face may have particular application to dual screen assemblies with screens on the top and bottom faces of the chassis, as will be explained in more detail below. For example, solids that pass through a top screen, but are caught by the bottom screen may move under the partial-depth ribs and/or cross ribs and out of a side of the chassis. Thus, the ribs and cross ribs may form channels (e.g. between the full-depth cross ribs 122 of the chassis 102 shown in FIGS. 6 and 7) for material to move between the dual screens and out of an open side or outlet of the assembly.

Screen assemblies are typically mounted to a screening machine by one or two sides of the screen assembly. For example, the screen assembly 100 shown in FIGS. 1 and 2 may be mounted by clamping or wedging the first and second short sides 106 and 108 of the chassis 102 into position. Thus, the long sides 110 and 112 may not be secured. The full-depth cross ribs 122 of the screen assembly 100 may provide more structural stiffness and support than the partial-depth cross ribs 124 and the ribs 126. The full-depth cross ribs 122 extending in the transverse direction may provide structural support and resistance to warping in response to the force applied to the short sides 106 and 108 from mounting the assembly 100.

Figure 17:
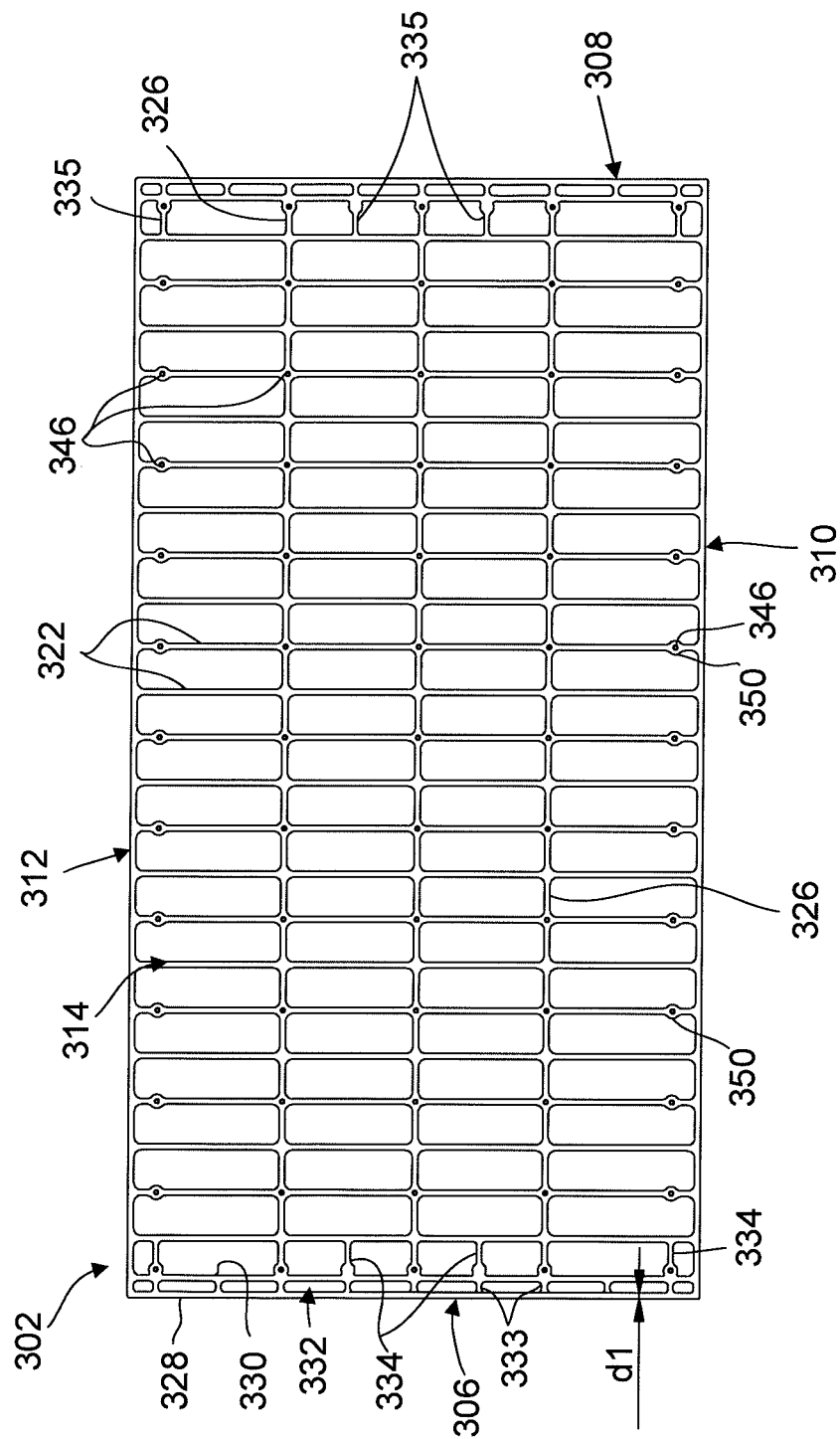
FIG. 17 is a top plan view of a chassis of the assembly shown in FIGS. 15 and 16.

FIG. 8 is an enlarged cross-section view of the portion of the chassis 102 within circle E in FIG. 7. As seen in FIG. 8, the second short side 108 of the chassis is shown. The short side 108 includes a wall 140 (with an L-shaped cross-section in this example) that may act as a mounting surface for mounting the screen assembly 100 (shown in FIGS. 1 and 2) in a vibrating screening machine. The first short side 106 (shown in FIG. 3) has a corresponding structure. In other embodiments, one or more sides do not include L-shaped side wall. For example, one or more sides may include two walls (e.g. ribs or cross ribs) close together (e.g. one inch apart) and joined by a series of short ribs or cross ribs. Such a configuration is shown in FIG. 17 and discussed in detail below. Other configurations are also possible.

Turning again to FIGS. 1 and 2, the frame 142 of the metal screen 104 is generally aligned with and covers with the grid structure of the chassis 102. The frame 142 includes an outer rectangular frame portion 143 with the openings 144 therein. Although not shown in FIGS. 1 and 2, the metal screen 104 includes a metal mesh (not shown) that covers the openings 120 and 140 to screen material (e.g. slurry) that passes over the screen assembly 100. The mesh is not shown so that other components are visible. Metal screen 104 is attached to the chassis 102 by fasteners 146 (shown in FIG. 1) at attachment points 130 (shown in FIG. 4). The fasteners may be bolts, screws, rivets, etc, to name a few examples. Any suitable means for attaching the metal screen to the chassis may be used, and embodiments are not limited to any particular attachment method.

The metal screen 104 is sized to cover the top face 114 of the chassis 102 (shown in FIG. 4). The combination of the lightweight, stiff chassis 102 with the metal screen 104 may provide a screen that weighs less than conventional screens while still providing sufficient structural durability. The metal screen 104 may act as a sort of exoskeleton for the chassis 102 that provides structural support and resistance to wear (from vibrations and/or material being screened) during normal operation of a vibrating screening machine.

FIGS. 1 and 2 also show optional end cover 105 that covers non-tapered cross rib ends 148. The metal screen 104 substantially covers the entire top face 114 of the chassis 102 (shown in FIG. 3).

In use, as material (e.g. slurry) to be screened falls on metal screen 104, larger solids are retained on the screen 104 while smaller solids pass through screen 104 and openings 144/120. The metal screen 104 may provide some protection and wear resistance (from the material being screened) for the chassis 102.

In some embodiments, the number of openings in the frame of the screen may be different (more or less) than the number of openings in the screen chassis. For example, in some embodiments, the frame of the screen may include only one large opening (e.g. a single large rectangular opening) that at least partially overlays the openings of the screen chassis. In some embodiments, instead of a mesh, another screening layer may be used (e.g. a perforated layer) to cover the frame. In other embodiments, the screen does not include a frame and may, for example, be formed of a perforated plate (such as a perforated metal plate). For example, a perforated stainless steel plate could be used.

In some embodiments, the screen assembly may be convertible between a single screen configuration and a dual screen configuration, where the assembly includes a second screen in the dual screen configuration. For example, the screen assembly 100 shown in FIGS. 1 and 2 may be converted into the dual screen assembly arrangement shown in FIG. 9.

Figure 9:
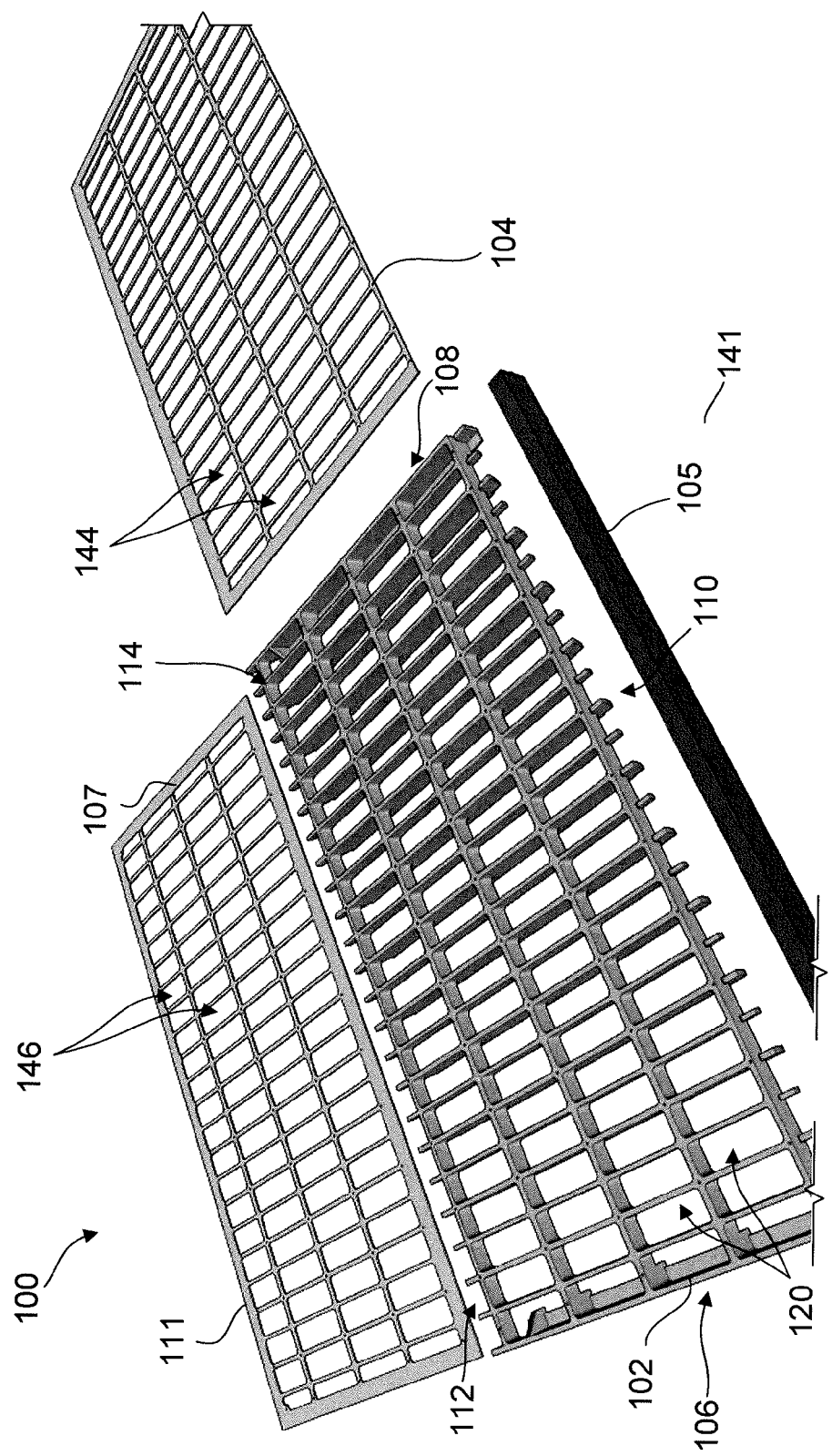
FIG. 9 is an exploded view of the screen assembly from FIGS. 1 and 2, but with the addition of a second metal screen to form a dual screen assembly.

For example, a metal screen may be placed on both the top face and the bottom face of the chassis. FIG. 9 is an exploded view of the screen assembly 100 from FIGS. 1 and 2, but with the addition of a second metal screen 107 on the bottom face 116 of the chassis 102 (shown in FIG. 3). FIG. 9 shows the plastic chassis 102, the first metal screen 104 discussed above, the end cover 105, and the second metal screen 107. The first metal screen 104 is attached to the top face 114 of the chassis 102, as described above. The second metal screen is attached to the bottom face 116 of the chassis 102 (shown in FIG. 3). The second metal screen 107 is sized to fit over the bottom face 116, and has openings 146 that align with the openings 120 in the chassis 102. As with the first metal screen 104, the second metal screen 107 includes a frame 111 (generally aligned with the grid structure of the chassis 102) and a mesh (not shown) covering the openings 146 for screening the material. It may be advantageous for the first, upper metal screen 104 to have a larger mesh size than the second, lower metal screen 107. That way, solids small enough to fit though the mesh of the first metal screen 104 may still be screened by the second metal screen 104. Similarly, if a perforated plate rather than a frame and mesh is used for at least the upper screen, the upper screen may have a perforation size that is greater than the mesh size or perforation size of the lower screen.

To convert the screen assembly 100 from the single screen configuration shown in FIGS. 1 and 2 to the dual screen configuration of FIG. 9, the end cover 105 may be removed and the lower metal screen 107 may be attached to the lower face 116 of the chassis 102. Thus, the assembly 100 may be converted between single and dual screen configurations as needed. The end cover 105 may be again placed on the assembly 100. Thus, in the single screen configuration, the lower metal screen 107 is not attached to the screen assembly 100, and in the dual screen configuration, the lower metal screen 107 is attached to the screen assembly 100.

The grid structure of the screen assembly 100 is bounded at three sides (i.e. has three closed sides). Specifically, the first and second side walls 140 and 141 form two closed sides (106 and 108). The first long side 110 is bounded or closed by the end cover 105. The second long side 112 (with the tapered cross rib ends 128 as shown in FIG. 3) is open, such that debris caught between the first metal screen 104 and the second metal screen 105 may pass under the partial-depth ribs 124 and the ribs 126 and exit out the second long end 112. The angled design of the second long side 112 (with the tapered rib ends 128 shown in FIG. 3) may allow debris between the two screens 104 and 107 to exit to another screen assembly below. Some arrangements of dual screen assemblies are discussed in International PCT Patent Application No. CA2014/000655 filed Aug. 26, 2014, the entire content of which is incorporated by reference.

Figure 10:
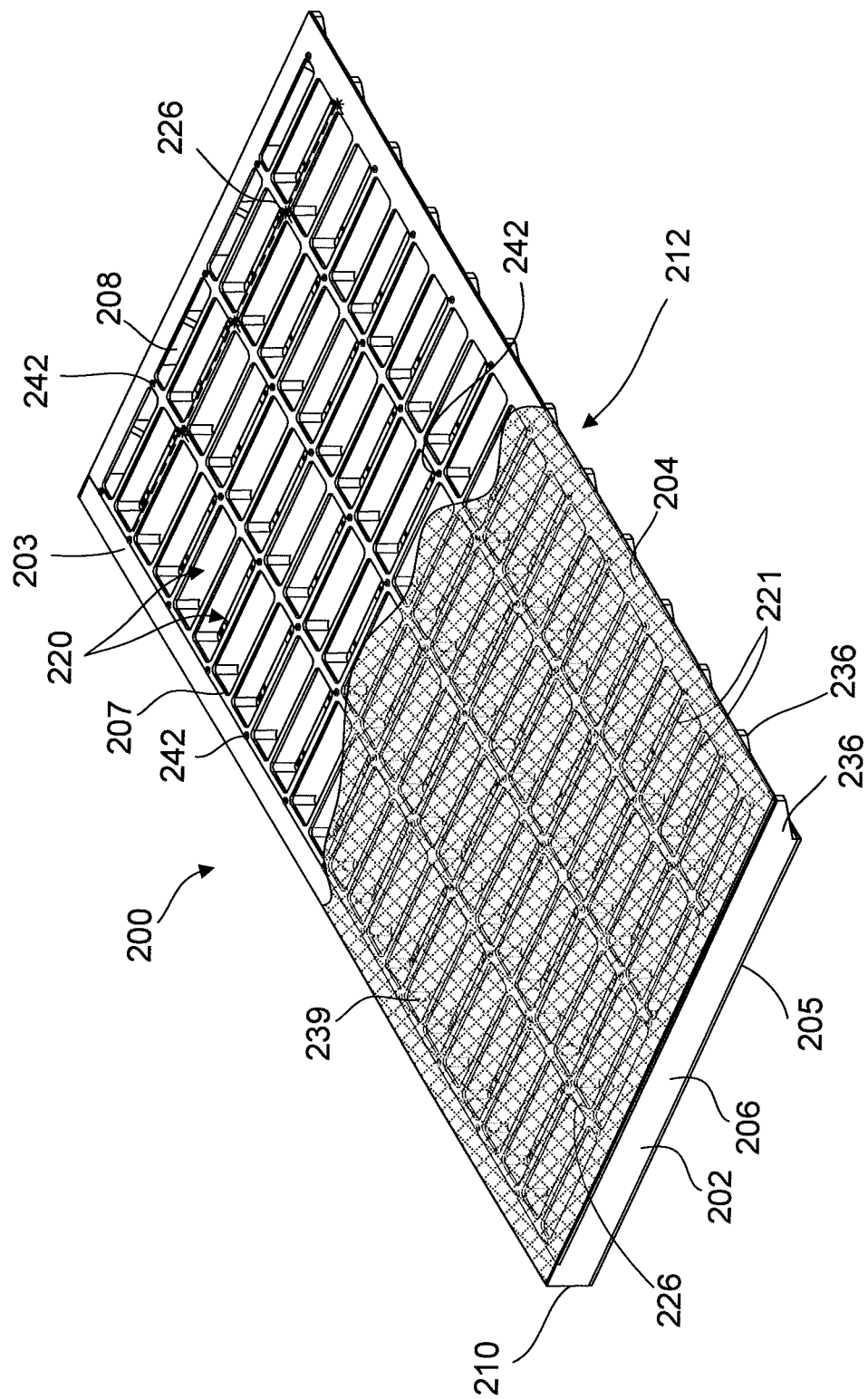
FIG. 10 is a top perspective view of a dual screen assembly according to another embodiment.
Figure 11:
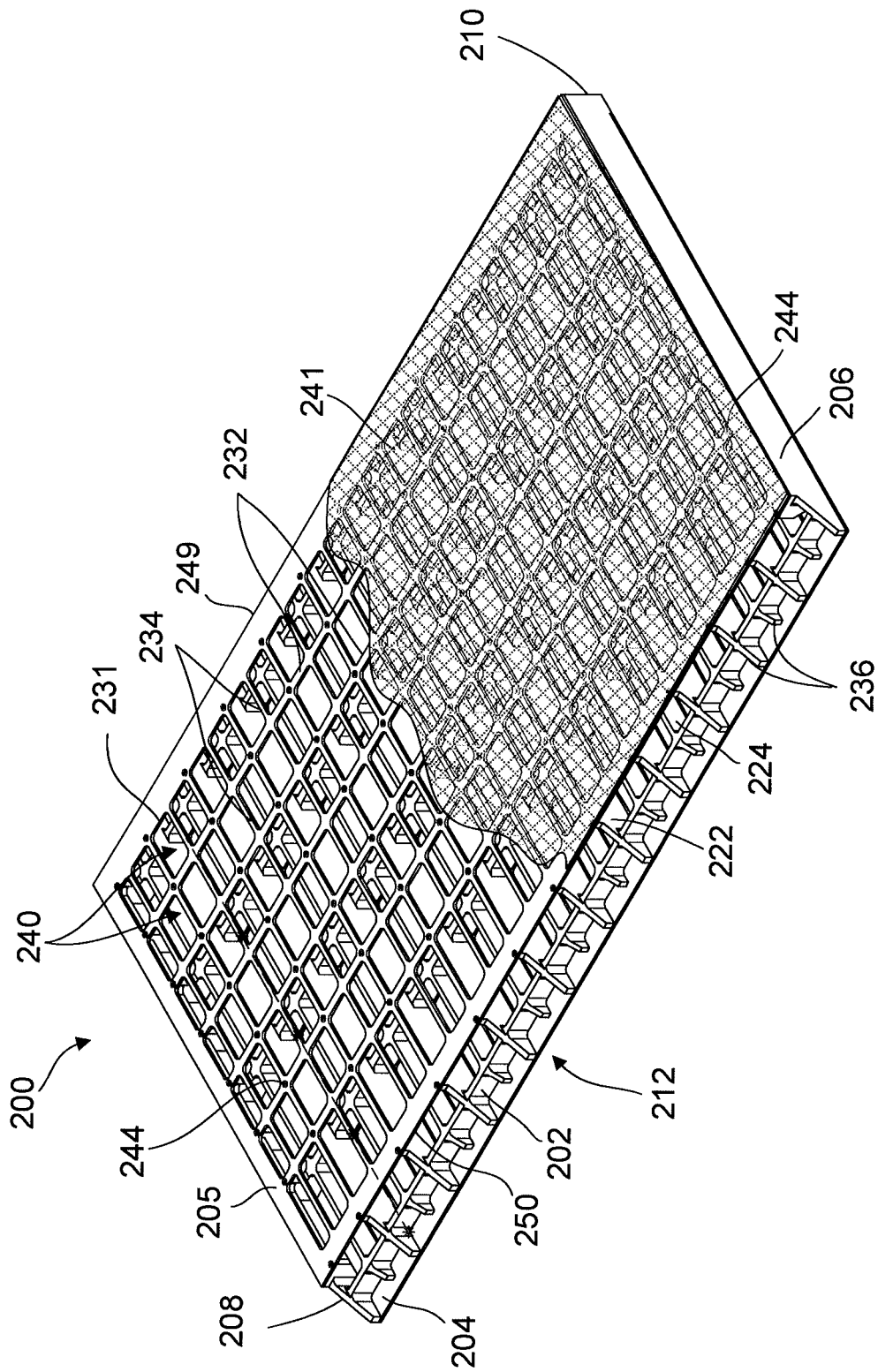
FIG. 11 is a bottom perspective view of the screen assembly of FIG. 10.

FIGS. 10 and 11 illustrate another dual screen assembly 200 according to some embodiments. Like the screen assembly 100 shown in FIGS. 1, 2 and 9, the screen assembly 200 may be converted between a single screen configuration and a dual screen configuration. A dual screen configuration is shown in FIGS. 10 and 11. FIG. 10 is a top perspective view of the screen assembly 200, and FIG. 11 is a bottom perspective view of the screen assembly 200. The screen assembly 200 includes a hard plastic chassis 202 that has a shape and structure similar to the chassis 102 shown in FIGS. 1 to 9. The screen assembly 200 also includes an end cover 203 (shown in FIG. 10) at a first long side 210, an upper metal screen 204, a lower metal screen 205. As mentioned above, embodiments are not limited to the chassis being formed of hard plastic or screens/frames being formed of metal. The chassis 202 also includes first and second short side walls 206 and 208, which are opposite from each other. The side walls 206 and 208 together with the end cover 203 bound three sides of the screen assembly. Opposite to the first long side 210 with the end cover 203 is an open second long side 212, which is similar to the long side 112 of the screen assembly 100 shown in FIGS. 1 and 2. The upper metal screen 204 includes frame 207 (shown in FIG. 10) and mesh 239 covering the openings 220 and frame 207. The mesh 239 is shown partially cut away in FIG. 10 to provide better visibility of the frame 207. As explained above, other embodiments may use a perforated plate or another type of screening layer (other than a mesh). The lower metal screen 205 may be removable to convert the screen assembly 200 to a single screen configuration.

The grid structure formed by the chassis 202 (and the corresponding grid structure of frame 207 of the upper metal screen 204) includes a series of ribs 126 and cross ribs 221. The ribs 226 are parallel to the long side wall 210 and are equally spaced apart between the long side wall 210 and the open second long side 212. The cross ribs 221 are parallel to and equally spaced apart between the first and second side walls 206 and 208. The cross ribs 221 include partial-depth ribs 222 and full-depth ribs 224 as shown in FIG. 11, and similar to the chassis 102 shown in FIGS. 1 to 9). The partial-depth ribs 222 and full-depth ribs 224 alternate similar to the chassis 102 shown in FIGS. 1 to 9. The grid structure defines openings 220. The cross ribs 221 and side walls 206 and 208 include tapered ends 236, similar to the cross ribs 122 and 124 of the screen assembly 100 shown in FIGS. 1 and 2.

The lower metal screen 205 in this embodiment includes a rectangular frame 231 defining openings 240 and includes mesh 241 covering the frame 231 openings 240. The mesh 241 is also shown partially cut away in FIGS. 11 and 12. Unlike the lower frame 105 shown in FIG. 9, the frame 231 of the lower metal screen 205 in this example includes more ribs 232 compared to the chassis 202 and first metal screen 204. Specifically, the frame 231 of the lower metal screen 205 defines approximately six ribs 232 space apart between two long sides 249 and 250 of the frame. The frame 231 also includes cross ribs 234 that are generally aligned with the cross ribs 221 of the chassis 202 and upper metal frame 204. The ribs 232 and cross ribs 234 of the lower metal screen form openings 240 that will be covered by the mesh (not shown). The dual screen assembly 200 shown in FIG. 10 and 11 has fewer ribs 226 in the grid structure formed by the chassis 202 and first metal screen 204 than the dual screen assembly example shown in FIG. 9. Again, the number and configuration (e.g. spacing, thickness, length, angle, etc.) of the ribs and cross ribs may vary in other embodiments based on several factors.

The upper metal screen 204 is attached to the chassis 202 at several locations by screws 242 (shown in FIG. 10). The lower metal screen 205 is similarly attached to the chassis 202 by several screws 244 (shown in FIG. 11). Other attachment means (e.g. bolts, rivets, adhesives, welding, etc.) may be used in other embodiments. The lower metal screen 207 and the upper metal screen 204 may reinforce the chassis 202, like an exoskeleton, to provide a lightweight, sufficiently stiff screen assembly 200 suitable for vibrating screen machines.

Figure 12:
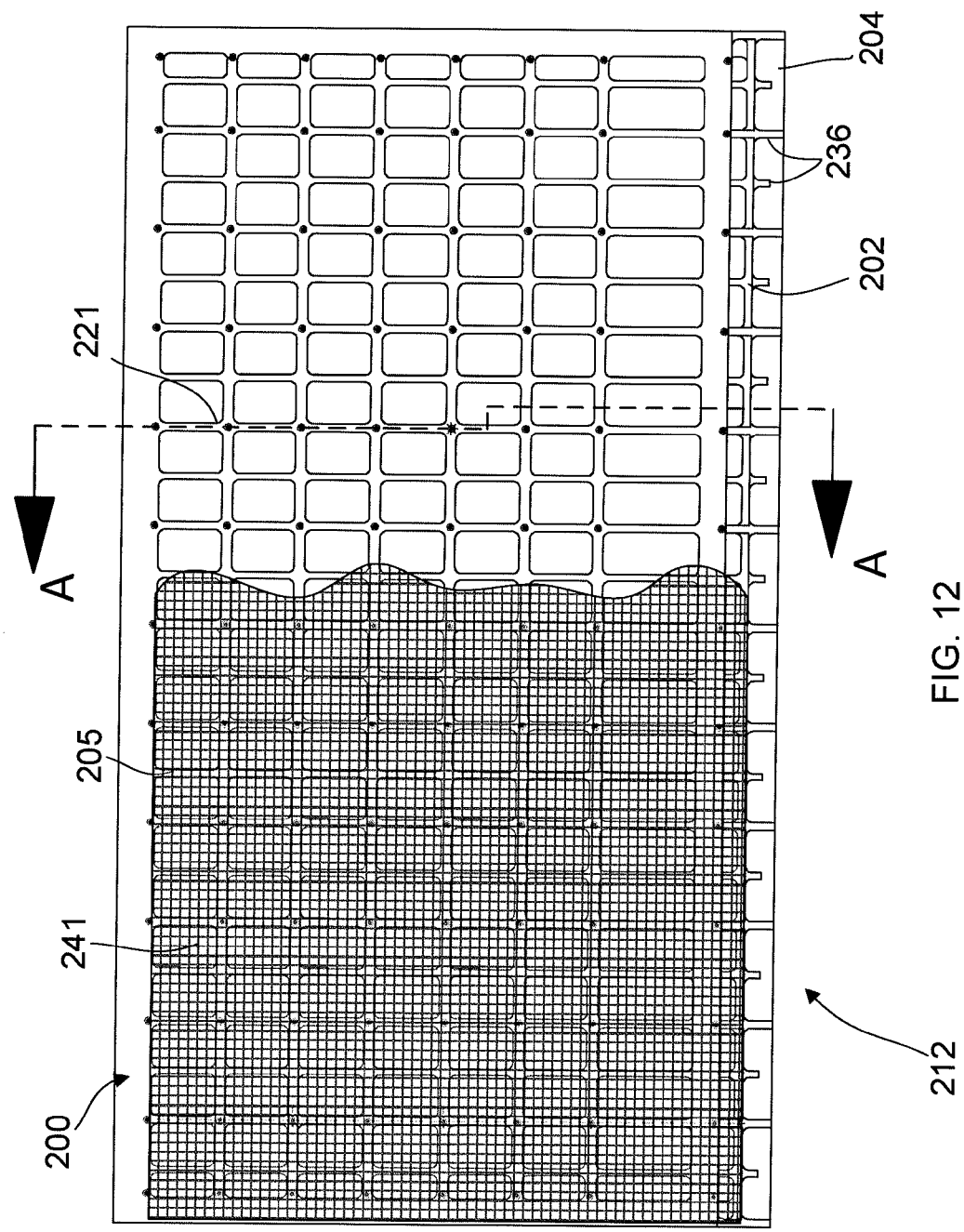
FIG. 12 is a bottom plan view of the screen assembly of FIGS. 10 and 11.

FIG. 12 is a bottom plan view of the screen assembly 200 (including mesh 241). The chassis 202, upper metal screen 204 and lower metal screen 205 are visible. The open second long side 212 is also visible where debris can exit from between the upper metal screen 204 and the lower metal screen 205 in the area of the tapered rib ends 236.

FIG. 13 is a cross section view of the screen assembly 200 taken along the line A-A shown in FIG. 12. The chassis 202, end cover 203, upper metal sheet 204 and lower metal sheet 205 are shown in FIG. 13. The line A-A in FIG. 12 extends across the width of the screen assembly 200. For part of the length of line A-A, the line bisects a cross rib 221 along its length, and then for the rest of the length of line A-A, it travels parallel and adjacent to that cross rib 221. Thus, FIG. 13 shows a partial cross section of cross rib 221 as well as cross sections of two ribs 226.

FIG. 14 is an enlarged view of the portion of the screen assembly 200 that is within the circle D in FIG. 13. FIG. 14 shows additional details of the end cover 203. The end cover includes a lower clamping section 252 with a cross-section that is generally C-shaped and a hollow upper section 254 with a rectangular cross section. The cross ribs 221 have cross rib ends 238 that are shaped to cooperate with the C-shaped lower clamping section 252 of the end cover 203. Specifically, the cross rib ends 238 include two small recesses 256 and 258 that the clamping section 252 can grab to secure the end cover 203 to the chassis 202.

FIG. 14 also shows screws 242 and 244 that attach the upper metal screen 204 and the lower metal screen 205 respectively to the chassis 202 in this embodiment.

Referring again to FIGS. 10 and 11, the mesh 239 of the upper metal screen 204 has a larger mesh size than the mesh 241 of the lower screen 205. In use, as material or slurry to be screened falls on upper metal screen 204, larger solids are retained on the upper metal screen 204 while mid-size and smaller solids may pass through the openings 220 and fall onto lower metal screen 205. Since lower metal screen 205 has a smaller mesh size than upper metal screen 204, the solids that are smaller enough to fit through upper metal screen 204, but too big to pass through lower metal screen 205, may be retained on lower metal screen 205. Smaller solids may pass through lower metal screen 205. Thus, the largest solids may be retained on upper metal screen 204, mid-size solids may be retained on lower metal screen 205 and the smallest solids may pass through both screens 204 and 205. The mid-size solids retained on lower metal screen 205 can then be selectively directed in channels formed between the full-depth cross ribs 222 (and under the partial-depth cross ribs 224 and ribs 226) and out of the open long side 212.

Figure 15:
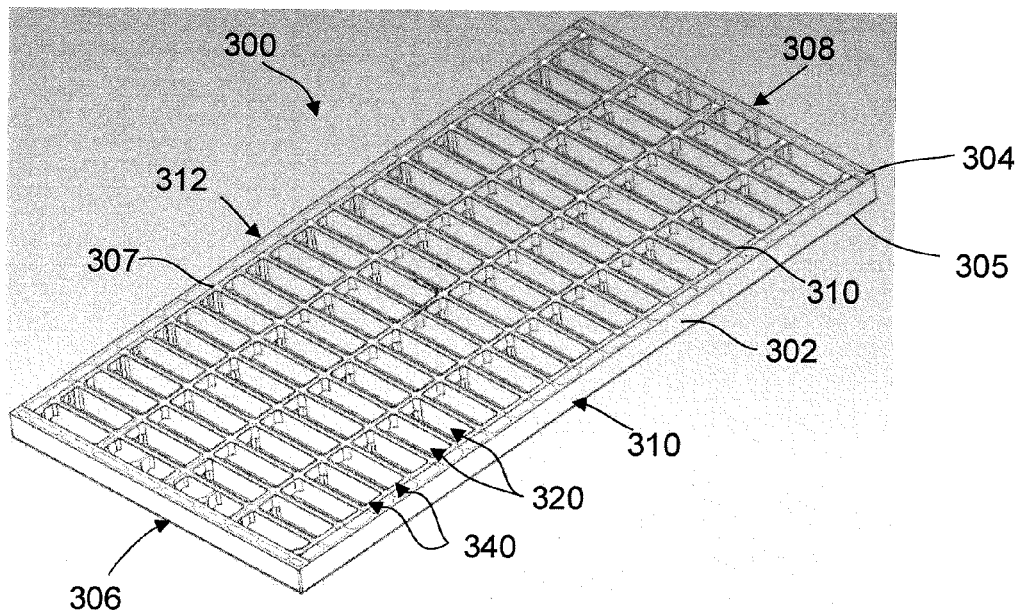
FIG. 15 is a top perspective view of a single screen assembly according to yet another embodiment.
Figure 16:
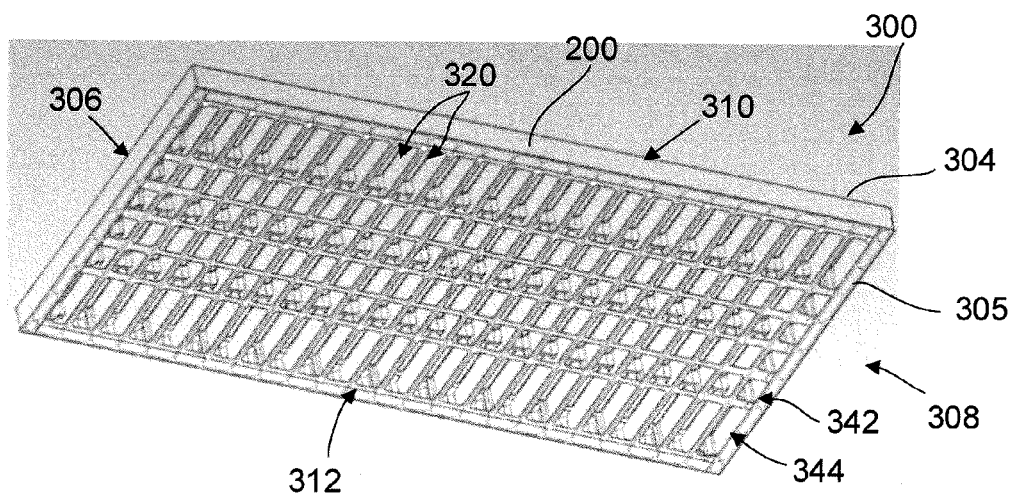
FIG. 16 is a bottom perspective view of the screen assembly of FIG. 15.

FIGS. 15 and 16 are, respectively, top and bottom perspective views of a single screen assembly 300 according to yet another embodiment. The screen assembly 300 includes a hard plastic chassis 302, an upper metal screen 304 on a top face (shown in FIG. 17) of the chassis 302, and a lower metal frame 305 on a bottom face (shown in FIG. 18) of the chassis 302. Similar to embodiments described above, the assembly is rectangular in shape, and the upper metal screen 304 and the lower metal frame 305 are sized to cover substantially the entire top and bottom faces of the chassis 302. As discussed above, embodiments are not limited to chassis formed of plastic, or screens formed of metal.

The chassis 302 has a grid structure defining openings 320, similar to the chassis 102 and 202 discussed above with reference to FIGS. 1 to 14. The upper metal screen 304 in this embodiment includes a frame 307 that defines openings 340 that have approximately the same size/shape and are aligned with the openings 320 in the chassis 302. The lower metal from 305 also defines a plurality of openings including small openings 342 and large openings 344. The large openings are sized similar to the openings 320 in the chassis 302, and each large opening 344 is aligned with a corresponding opening 320 in the chassis 302. The small openings 342 are approximately half the size of the openings 320 in the chassis 302, and pairs of two small openings 342 are aligned with respective openings 320 in the chassis 302.

The upper metal screen includes a mesh 309 (shown in FIG. 21) covering the openings 340 to screen material placed on the screen assembly 300. Another type of screening layer (rather than a mesh) or a perforated plate (without a frame) may be used in other embodiments.

In the embodiment of FIGS. 15 and 16, the lower metal frame 305 does not include a mesh covering its openings in this embodiment and is provided for structural support of the chassis. Material that passes through the upper metal screen 304 may pass through the openings 342 and 344 in the lower metal frame 305. The upper metal screen 304 and the lower metal frame 305 may act as an exoskeleton providing structural support and provide protection/wear resistance for the plastic chassis 302.

The chassis 302 in this embodiment does not have an open side. Rather, the chassis has four closed sides 306, 308, 310 and 312, which function as ribs/cross ribs in the grid structure.

Figure 24:
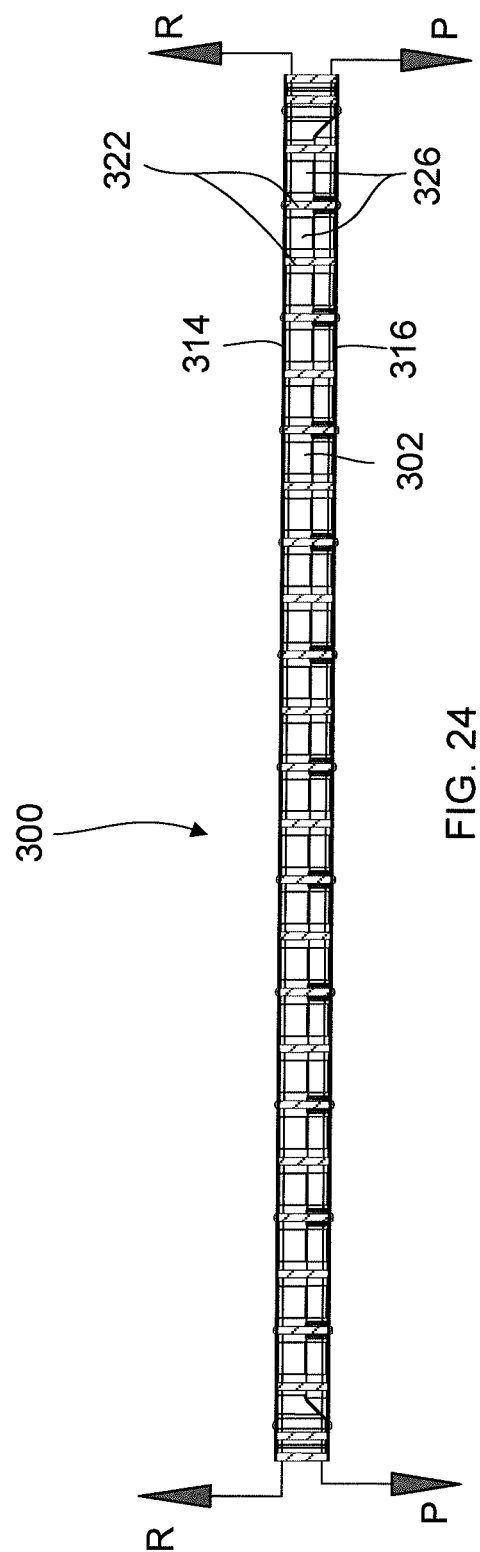
FIG. 24 is a cross section side view of the screen assembly of FIG. 24 taken along the line L-L in FIG. 23.

FIG. 17 is a top plan view of the chassis 302 shown in FIGS. 15 and 16. The chassis 302 includes a first short side 306, a second short side 308 opposite to the first short side 306, a first long side 310, and a second long side 312 opposite to the first long side 310. The chassis includes 23 cross ribs 322 parallel to and spaced equally between the short sides 306 and 308. In this embodiment, each of the cross ribs 322 is full-depth, extending the full thickness of the chassis 302 (similar to the cross ribs 122 of the chassis 102 shown in FIGS. 1 to 8). The chassis 302 also includes a plurality of ribs parallel to and equally spaced between the long sides 310 and 312. As shown in FIG. 24 and discussed below, the ribs 326 are partial-depth, extending only part way from the top face 314 of the chassis 302 (similar to the ribs 126 of the chassis 102 shown in FIGS. 1 to 8).

The first short side 306 in this embodiment has an outer side wall 328 and an inner side wall 330. In this embodiment the inner and outer side walls 328 and 330 of the first short side 306 are about one inch apart, although this distance is only provided by way of example and other separations may be used. The first short side 306 also defines a plurality of openings or hollows 332 between the outer facing surface 328 and an inner facing surface 330. The inner side wall 328 and the outer side wall 330 essentially form cross ribs that are joined by short ribs 333 between the inner side wall 328 and the outer side wall 330. The inner side wall 328 and the outer side wall 330 and the short ribs 333 thereby define the hollows 332. The hollows 332 extend from the top face 314 of the chassis 302 to the bottom face 316 shown in FIG. 18. The second short side 308 has a structure that corresponds to the first short side 306. This structure may provide a relatively thick side wall with the hollows 332 reducing overall weight. The first and second long sides 310 and 312 are walls that essentially form ribs have a thickness approximately equal to the thickness of the other ribs 326 and cross ribs 322 of the chassis 102. The chassis 302 also includes a plurality of additional short ribs 334 between the first short side 306 and the cross rib 322 closest to the side wall. Similar short ribs 335 are located at the second short side wall.

FIG. 17 also shows attachment points 346 on the top face 314 for attaching the upper metal screen 304 to the chassis 302. Similar attachment points 348 are defined on the bottom face 316 (shown in FIG. 18) for attaching the lower metal frame 305.

Some example dimensions of the chassis 302 will now be described. However, it is to be understood that the dimensions are provided by way of example only, and the chassis (including ribs, cross ribs, and chassis walls) may have different dimensions in other embodiments.

In the example of FIG. 17, the chassis is approximately 25 inches wide by 49.25 inches long by 2 inches thick. Other sizes are also possible. The ribs 326 and cross ribs 322 have an approximate thickness of 0.252 inches. The attachment points 346 in this example are holes with an inner diameter of approximately 0.20 inches. The distance between the outer surface of the first short side 306 and the hollow portion 332 (as indicated by "d1" in FIG. 13) is 0.265 inches. The hollows 332 in the first and second short walls 306 and 308 may be spaced apart from each other by approximately 0.215 inches. The second short 308 has a corresponding structure. As shown in FIG. 13, where an attachment point 346 is not located on an intersection of the cross ribs 322 and ribs 326, the width of the cross rib 322 around the attachment point widens for form a generally circular bulge 350.

Figure 18:
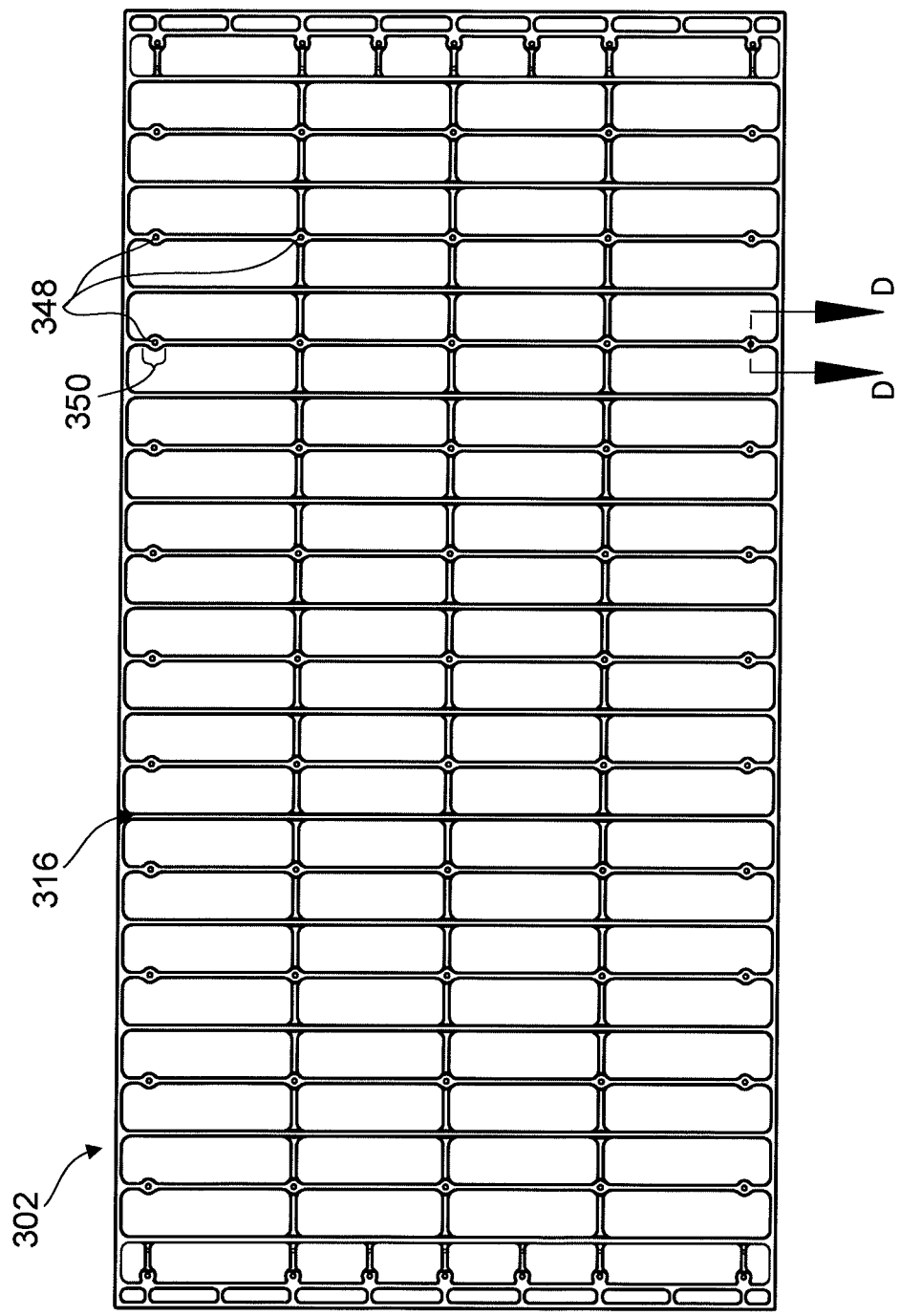
FIG. 18 is a bottom plan view of a chassis of FIG. 17.

FIG. 18 is a bottom plan view of the chassis 302 shown in FIG. 17. The attachment points 348 in bottom face 316 for attaching the lower metal frame 305 (shown in FIG. 16) are visible.

Figure 19:
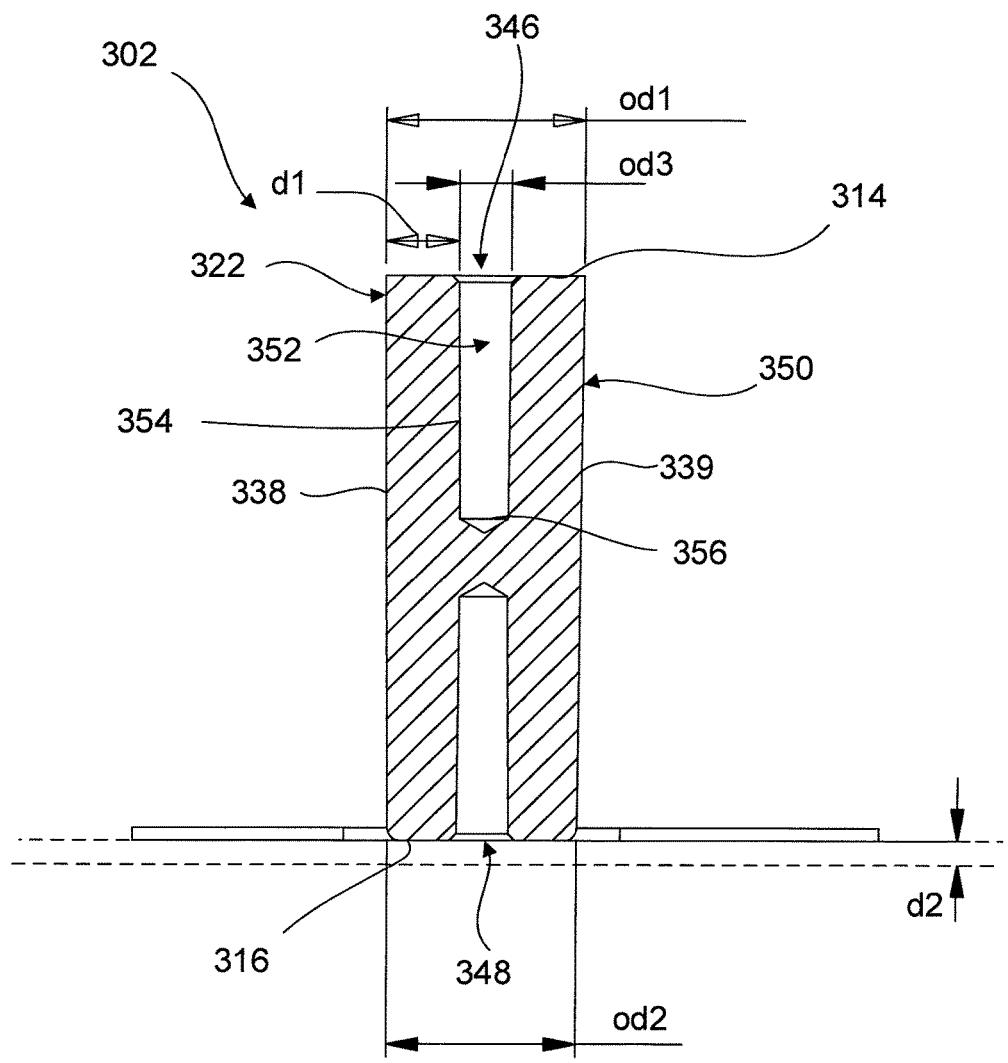
FIG. 19 is an enlarged partial cross sectional view of the chassis of FIG. 18 taken along the line D-D in FIG. 18.

FIG. 19 is an enlarged partial cross sectional view of the chassis 302 taken along the line D-D in FIG. 18. FIG. 19 shows more detail of the attachment points 346 in the upper face 314 and the attachment points 348 in the lower face 316 of the chassis 302. It is to be understood that the details (dimensions, shapes, configuration etc.) of the cross rib 322 and attachment points 346 and 348 are exemplary and embodiments are not limited to the specific details described below. The size, shape and configuration of the cross ribs and attachment points may vary.

In this embodiment, the cross rib 322 has side walls 338 and 339, which curve around the attachment points 346 and 348 to form the circular bulge 350. The cross section of FIG. 19 is taken at the widest point of the circular bulge 350. As shown in FIG. 19, the attachment point 348 is in the form of a hole 352 having hole wall 354. The hole 352 is in the approximate center of the circular bulge 350.

In this embodiment, the side walls 338 and 339 of the cross rib 322 are angled to each other by about 0.5 degree such that the cross rib 322 slightly narrows or tapers from the top face 314 to the bottom face 316. This slight tapering or "draft" may be provided for molding purposes may aid in ejection of the molded chassis from the mold. At the top face, the circular bulge 350 in the cross rib 322 has outer diameter "od1", which is approximately 0.610 inches in this embodiment. At the bottom face, the circular bulge 350 has outer diameter "od2", which is approximately 0.580 inches. The hole 352 has a diameter "od3", which is approximately 0.160 inches at the top face 314 of the chassis 302. The hole wall 354 is angled such that the hole 352 slightly narrows as it extends into the chassis 302 from the top face 314, and the hole 352 has a diameter of approximately 0.148 inches near its bottom 356. The hole 352 is approximately 0.754 inches deep in this example. The hole 352 is shaped for receiving a bolt or rivet (not shown in FIG. 18) to attach the upper metal screen 304 (shown in FIG. 15) to the chassis 302. At the top face 314, the distance "d1" from the circumference of the hole 352 to the circumference of the circular bulge 350 is approximately 0.225 inches. The attachment point 348 at the lower face 316 is similar to the attachment point 346 in the upper face discussed above.

FIG. 19 also shows, using stippled lines, the thickness "d2" of the lower metal frame 307. In this embodiment, the thickness d2 is 0.075 inches. A bolt (not shown) that is 0.75 inches long may be received in attachment point 348 to attach the lower metal screen 307 to the chassis 302. The upper metal screen 304 may similarly be attached to the upper face 314. With reference again to FIGS. 17 and 18, the plurality of attachment points 346 and 348, together with corresponding bolts, screws or rivets, may securely attach the upper metal screen 304 and the lower metal frame 307 to the chassis.

Figure 20:
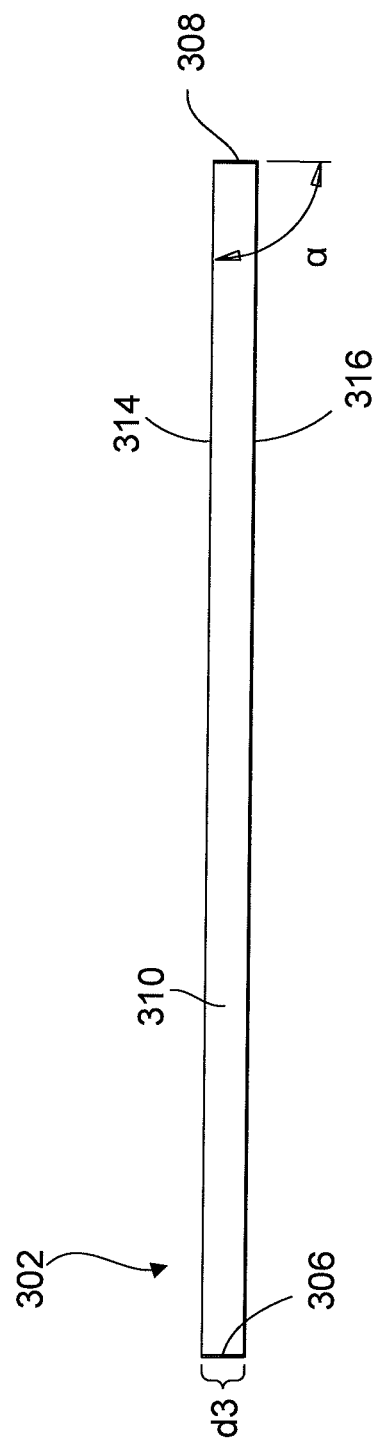
FIG. 20 is a side view of the chassis of FIGS. 17 and 18.

FIG. 20 is a side view of the chassis 302 showing the first long side 310. The thickness of the chassis is indicated by "d3" in FIG. 20. In this embodiment, the chassis is approximately 2 inches thick. The short side 308 is at a slightly acute angle "α" from the bottom top face 314. The angle α in this example is approximately 89.5 degrees. This angle (i.e. draft) may allow the chassis 302 to be more easily ejected from a mold when formed.

Figure 21:
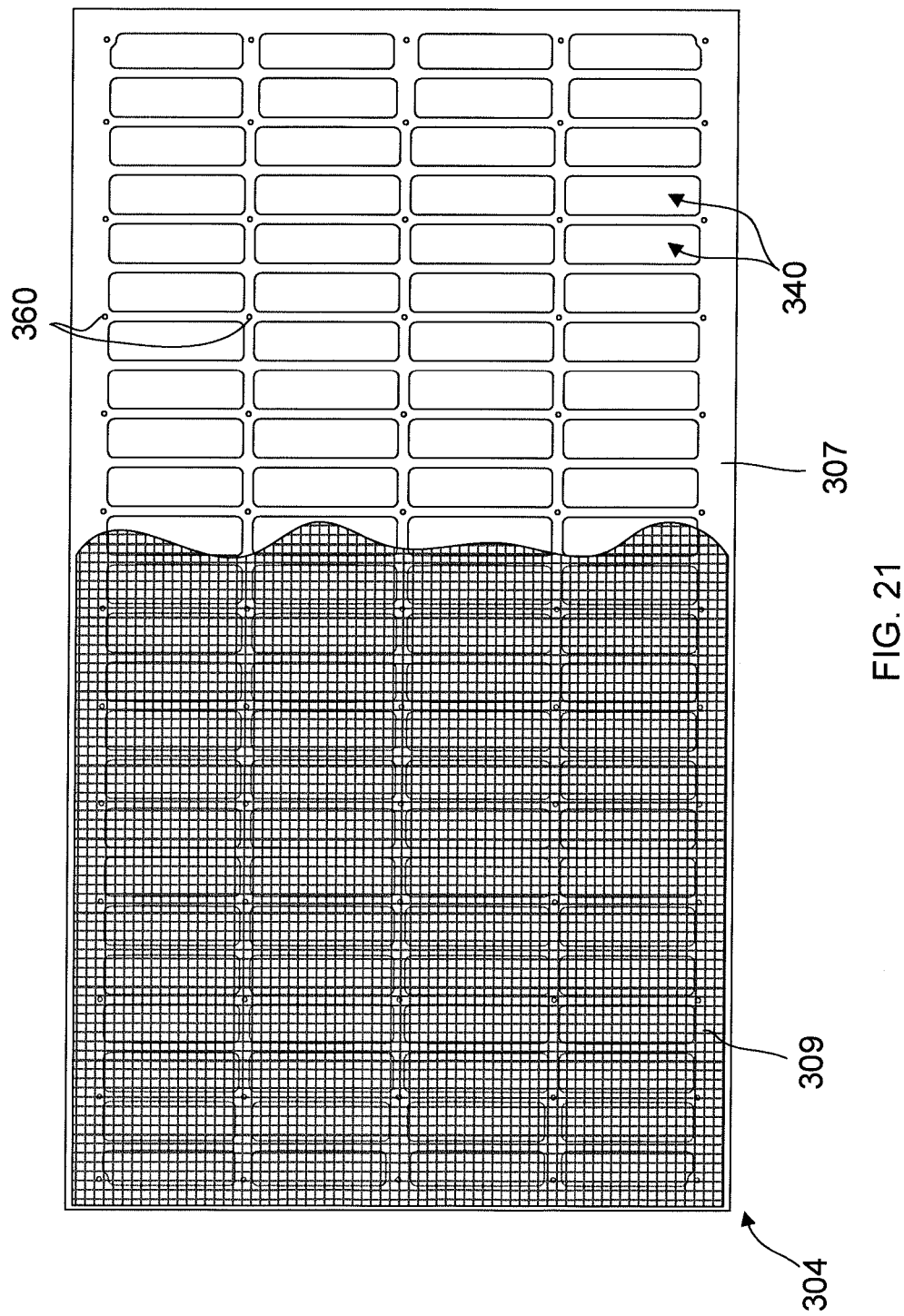
FIG. 21 is a top plan view of an upper metal screen of the screen assembly shown in FIGS. 15 and 16.

FIG. 21 is a top plan view of the upper metal screen 304 showing the frame 307 of the metal screen and the mesh 309. The mesh 309 is partially cut away so that the frame 307 is also visible. However, the mesh 309 will cover all of the openings 340 of the frame 307 for screening material that falls on the screen 304. The mesh size of the mesh 309 may vary and may depend on the type of material to be screened. Similarly, for embodiments using a perforated plate (rather than a frame and mesh type screen), the perforation size may depend on the type of material being screened. In FIG. 21, holes 360 are defined in the frame 307, and the holes 360 are arranged to align with the attachment points 346 in the upper face 314 of the chassis 302 (shown in FIG. 17). The holes 360 in this embodiment receive bolts or rivets to secure the upper metal screen 304 to the chassis 302. However, any suitable method for attaching a metal screen to a chassis may be used.

The frame 307 of the upper metal screen 304 has a grid structure that is aligned with the chassis 302 shown in FIG. 17. The openings 340 in the frame 307 aligned with the openings 320 of the chassis 302.

The frame 307 of the upper metal screen 304 may be manufactured, for example, from sheet metal. For example, the sheet metal may be cut to form a rectangle that has the same size as the top face 314 of the chassis 302, and the openings 340 and holes 360 may be cut in the sheet metal.

The openings 340 and holes 360 could also be cut before or at the same time as the outer rectangle shape of the frame 307.

In some embodiments, sheet metal for a frame of a screen or a perforated plate may be cut and folded along its edges so that it covers one or more sides or ends of the chassis as well as the top or bottom face of the chassis. This folding of the sheet metal could cover substantially cover each side of the chassis for a single screen embodiment, for example. For a dual screen embodiment, three sides of the chassis could be covered by the sheet metal, with an open side not covered by the sheet metal so that material can still exit through the open side. By folding the sheet metal to cover one or more sides of the chassis, the overall structural strength of the screen assembly may be improved.

Figure 22:
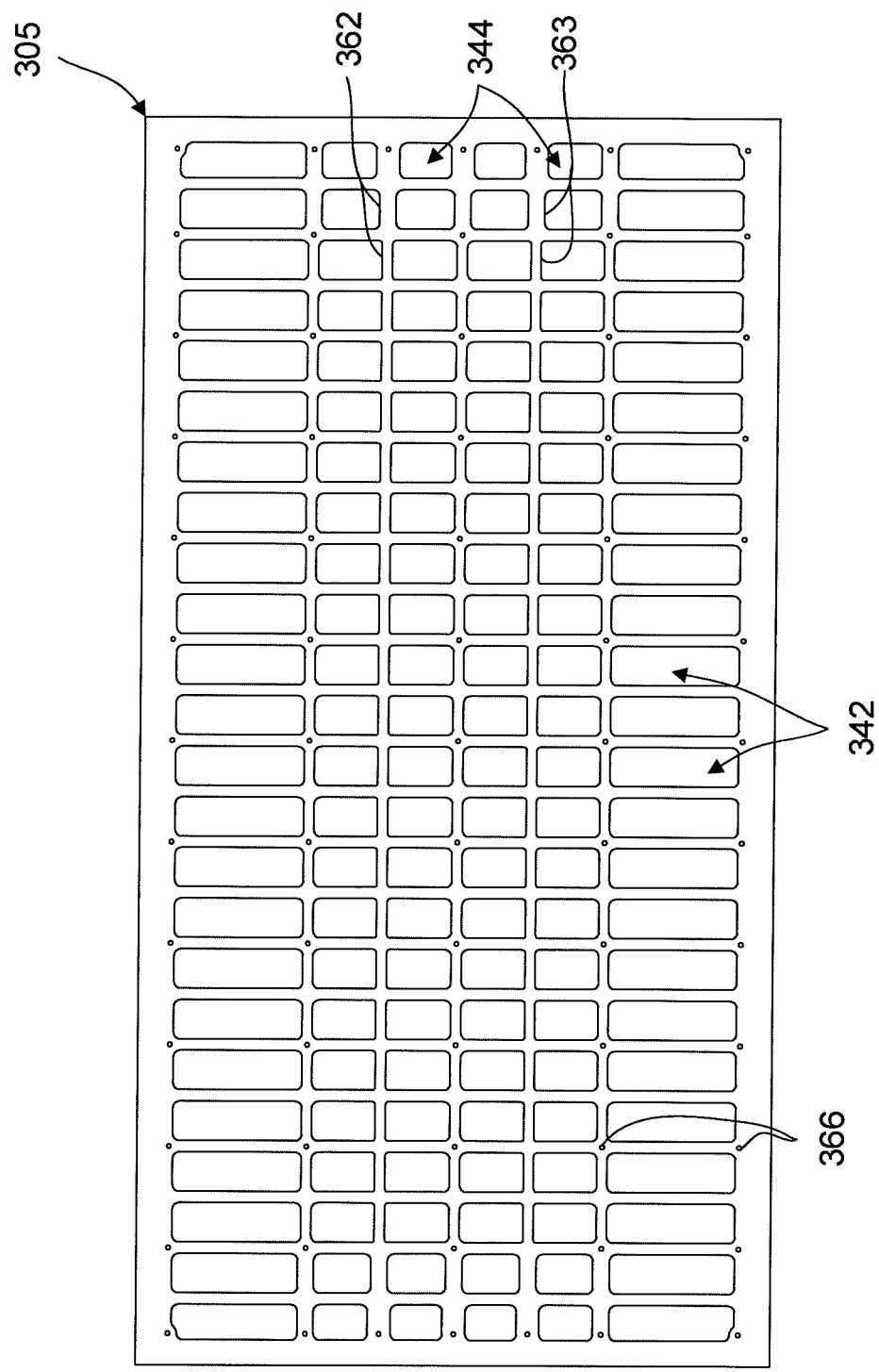
FIG. 22 is a bottom plan view of a lower metal frame of the screen assembly shown in FIGS. 15 and 16.

FIG. 22 is a bottom plan view of the lower metal frame 305 that is to be attached to the bottom face 316 of the chassis 302 shown in FIG. 18. The lower metal frame 305 may also be manufactured from sheet metal, for example. The lower metal frame 307 includes large openings 342 and small 344. The large openings 342 are generally aligned with openings 320 of the chassis 302 that are nearest the long sides 310 and 312 of the chassis 302 (shown in FIG. 16). The frame 307 has a grid structure that, in comparison to the chassis 302, includes two additional ribs 362 and 363 that, when attached to the chassis 302, are spaced between the three center most cross ribs 322 of the chassis 302, thereby creating the smaller openings 344. The small openings 344 are aligned such that pairs of small openings 344 cover respective single openings 320 of the chassis 302. The size and/or arrangement of the openings on the lower metal screen may vary in some embodiments. By including smaller openings, the structural strength/stiffness provided by the lower metal screen may be improved. Thus, the design of the lower metal screen may vary depending on the required structural strength/stiffness required for a particular application. The lower metal frame 305 also defines holes 366 that are arranged to align with the attachment points 348 in the lower face 316 of the chassis 302 (shown in FIG. 18). The holes 366 in this embodiment receive bolts or rivets to secure the lower metal frame 305 to the chassis 302. However, any suitable method for attaching a metal frame to a chassis may be used, as explained above.

Figure 23:
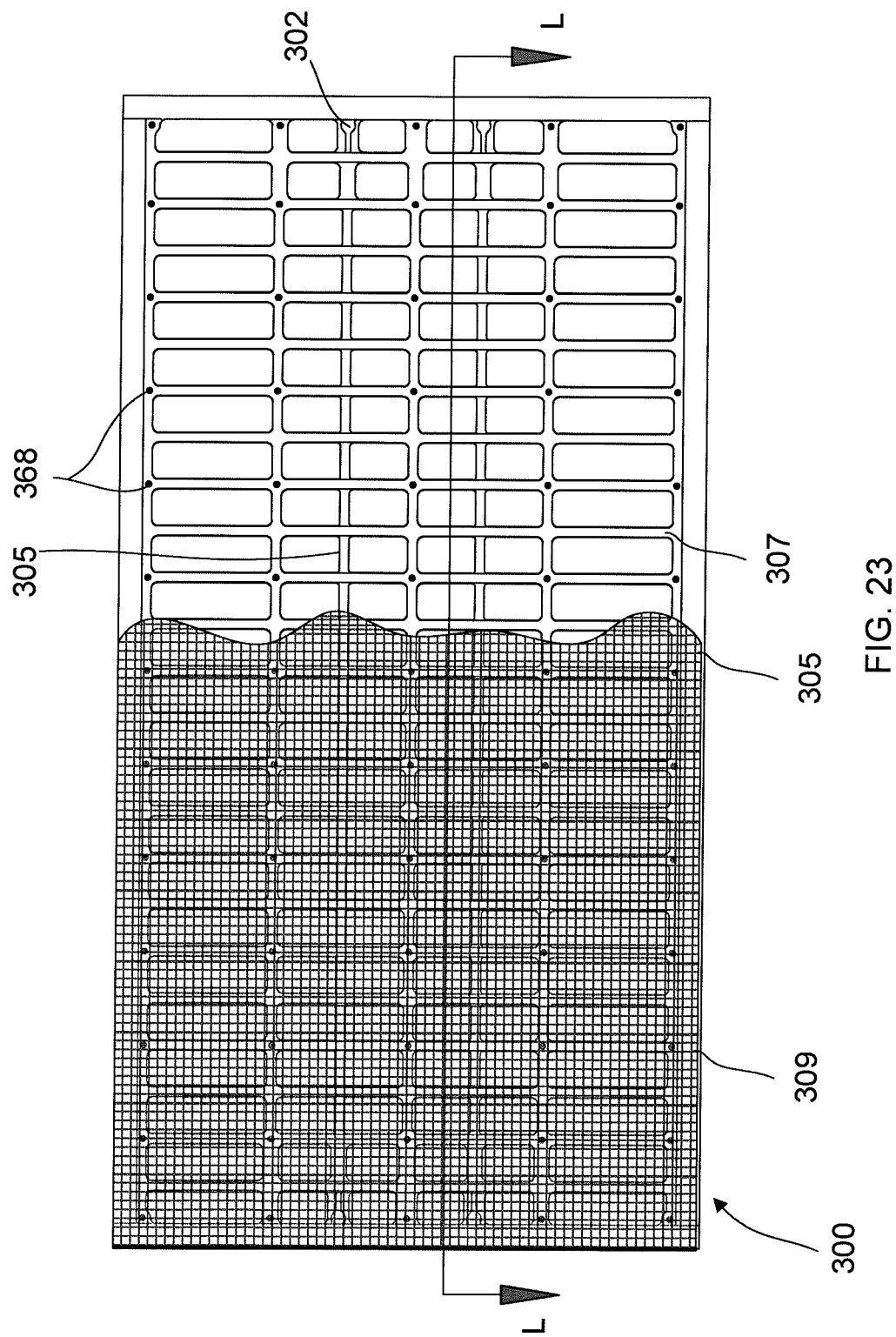
FIG. 23 is a top plan view of the assembled screen assembly of FIGS. 15 and 16.

FIG. 23 is a top plan view of the assembled screen assembly 300. In FIG. 18, the mesh 309 is shown, but is again cut away to show other components of the screen assembly 300, including the metal frame 307 of the upper metal screen 304 and the lower metal frame 305. Bolts 368 attaching the upper metal screen 304 to the chassis 302 are also shown in FIG. 23.

FIG. 24 is a cross section side view of the screen assembly 300 taken along the line L-L in FIG. 23. Cross sections of the cross ribs 322 are visible, as are the ribs 326. As seen, the ribs 326 extend from the top face 314 of the chassis 302 and only part way to the bottom face, whereas the cross ribs 322 extend fully between the top face 314 and bottom face 316, thereby having a depth that equals the thickness of the chassis 302.

Figure 25:
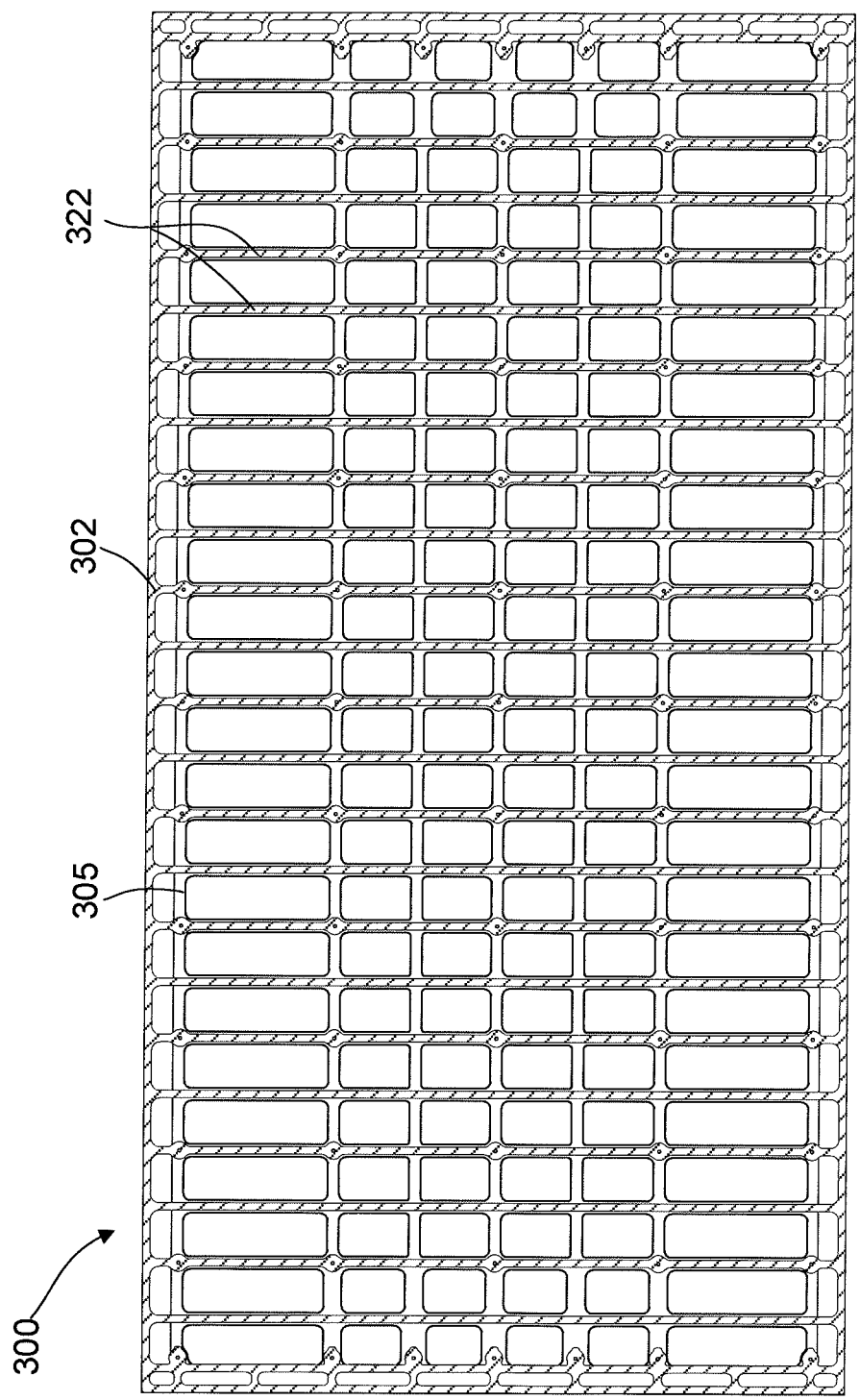
FIG. 25 is a cross section top view of the screen assembly of FIG. 24 taken along the line P-P in FIG. 24.

FIG. 25 is a cross section top view of the screen assembly 300 taken along the line P-P in FIG. 24. The line P-P in FIG. 23 is below the level of the ribs 326. Thus, the cross ribs 322, but not the ribs 326, of the chassis 302 are visible in FIG. 25. FIG. 25 also shows the lower metal frame 305.

Figure 26:
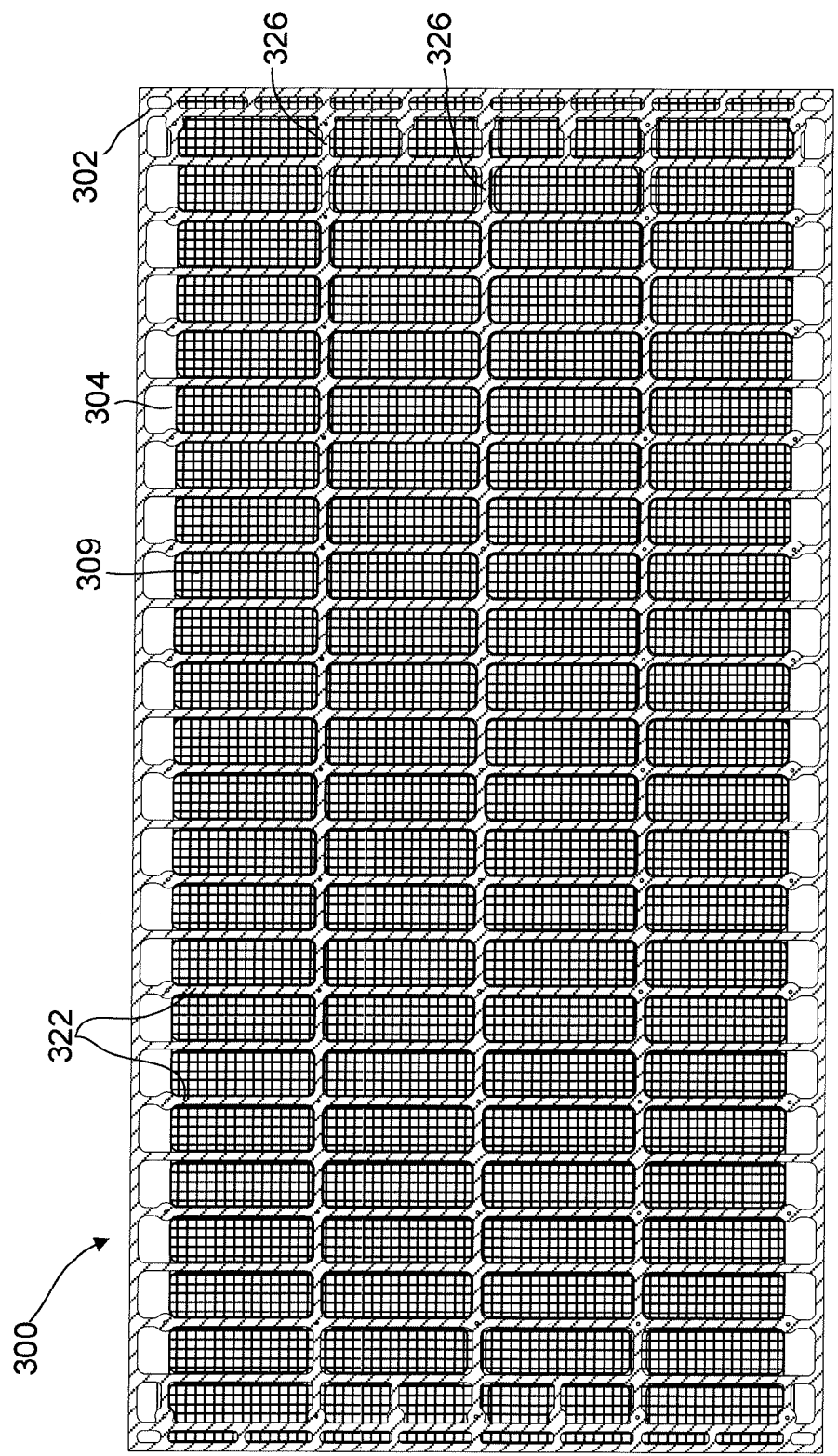
FIG. 26 is a cross section bottom view of the screen assembly of FIG. 23 taken along the line R-R in FIG. 24.

FIG. 26 is a cross section bottom view of the screen assembly 300 taken along the line R-R in FIG. 24. The ribs 326 and cross ribs 322 of the chassis 302 are visible in FIG. 26. FIG. 26 also shows the upper metal screen 304 including the mesh 309.

Figure 30:
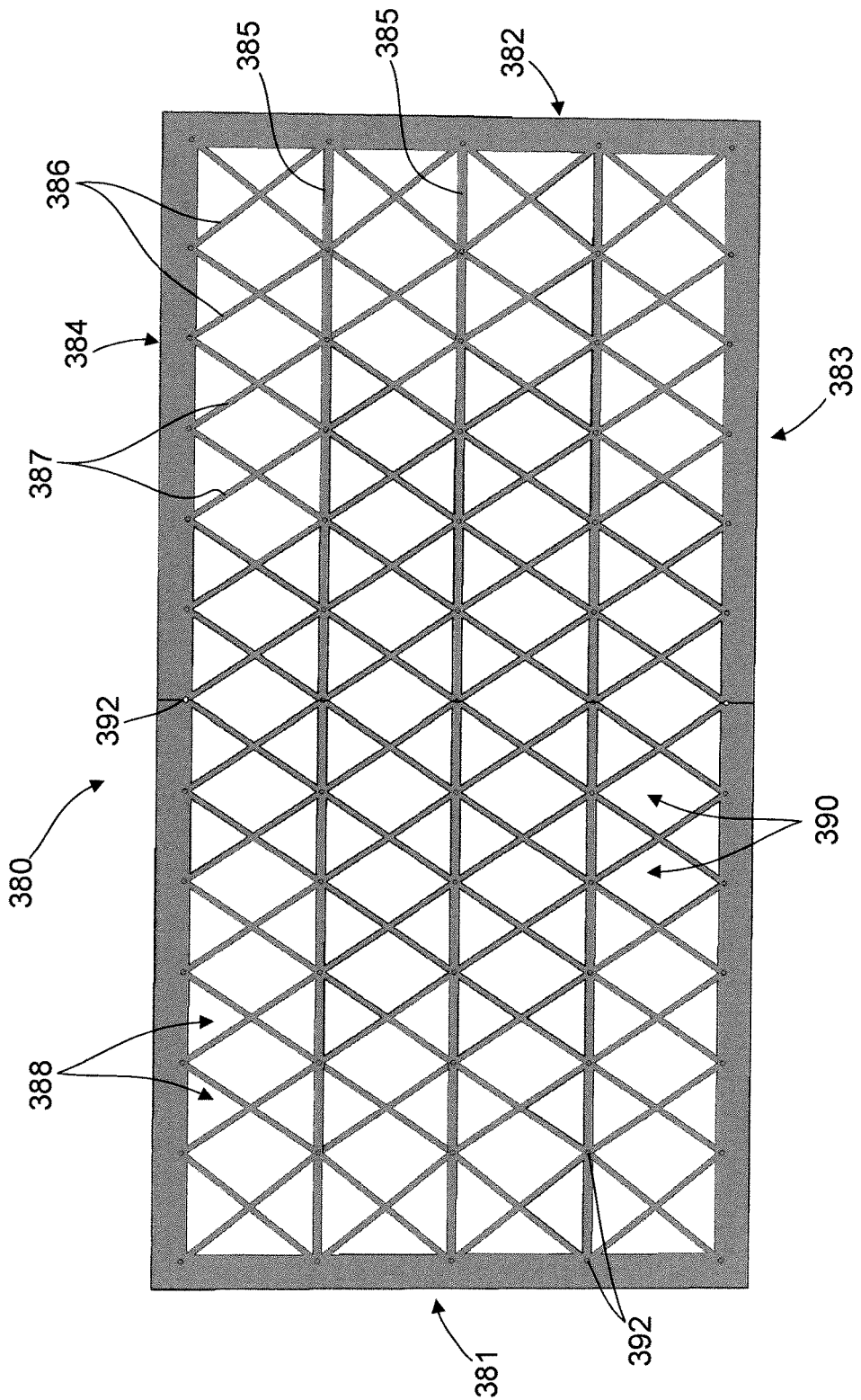
FIG. 30 is a top view of a metal frame according to another embodiment.

As with frames for metal screens, the configuration of lower metal frames (without a mesh or other screening layer) for screen assemblies may vary. FIG. 30 is a top view of a lower metal frame 380, according to another embodiment, that could be attached to a bottom face of a chassis. For example, the frame 380 could be attached to the bottom face 316 of the chassis 302 shown in FIGS. 15 to 20 and 23 to 26 rather than the lower metal frame 305. The lower metal frame 380 shown in FIG. 30 has first and second opposite short sides 381 and 382 and first and second opposite long sides 383 and 384. The lower metal frame 380 has a grid structure including longitudinal ribs 385 that extend between the first and second short sides 381 and 382. The grid structure also includes a first set of several cross ribs 386 that are angled approximately 60 degrees to the ribs, and a second set of several cross ribs 387 that are angled approximately 60 degrees to the ribs (in the opposite direction) and to the first set of cross ribs 386. This arrangement of ribs 385 and cross ribs 386 and 387 defines several triangle shaped openings 388 and several diamond shaped openings 390. The openings 388 and 390 may allow screened material to pass through from the chassis. Depending on the structure of the screen chassis to which the lower metal frame 380 is attached, the openings 388 and 390 may or may not be aligned with openings of the screen chassis. The lower metal screen 380 also includes attachment points 392 (e.g. holes for screws, bolts etc.) for facilitating attachment to a screen chassis. The lower metal screen 380 may be attached to a screen chassis using any suitable means. The grid structure of the lower metal screen 380 may provide structural support for a screen assembly when attached to a chassis. A similar grid structure may also be used for the frame of a metal screen (upper or lower) in some embodiments.

Figure 27:
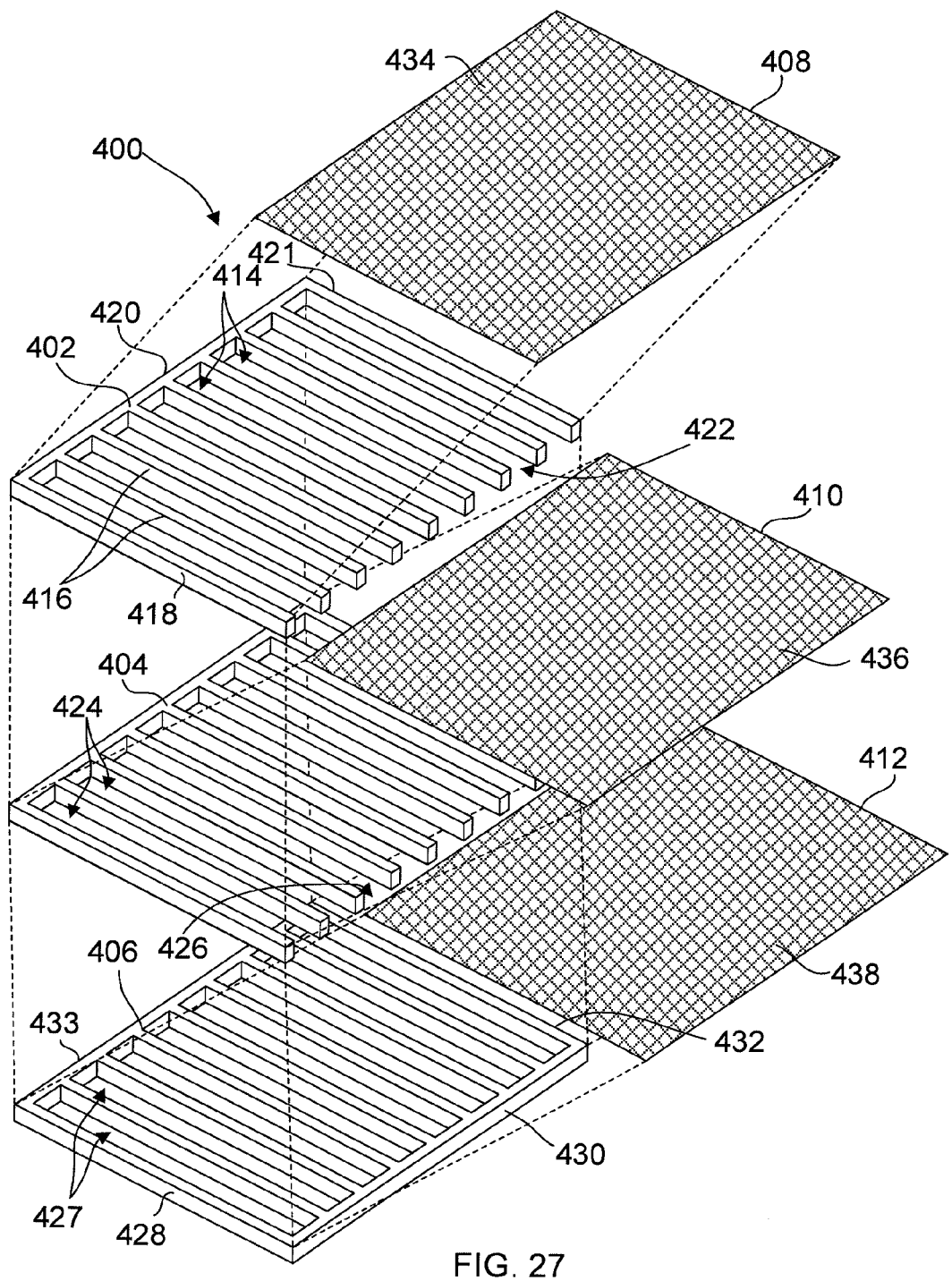
FIG. 27 is an exploded view of a stacked screen assembly according to yet another embodiment.

In some embodiments, multiple screen and chassis may be stacked such that three or more screens (possibly with different mesh sizes) may be used in a cascading manner. FIG. 27 is an exploded view of a stacked screen assembly 400 according to one example embodiment. The stacked screen assembly includes a first chassis 402, a second chassis 404, and a third chassis 406. Each chassis has a rectangular shape (and thickness) that is similar to the chassis discussed above. However, the shape of the screen assemblies in other embodiments may vary. The stacked screen assembly 400 also includes a first screen 408, a second screen 410 and a third screen 412.

In this embodiment, each of the chassis 402, 404 and 406 is made of hard plastic (although plastic is not required in all embodiments). The first chassis 402 and the second chassis 404 have a channel design. Specifically, with reference to the first chassis 402, the chassis 402 defines multiple long channels 414 between arms or extensions 416. The extensions 416 have a depth equal to the thickness of the chassis 402. The first chassis 402 also has three closed sides 418, 420 and 421 and one opened side 422. The second chassis 404 has the same structure as the first chassis 402, defining channels 424 and having one open side 426. The third chassis 406 also defines channels 427, but has four closed sides 428, 430, 432 and 433 (and no open side). The arms/extensions 416 have rectangular cross sectional profile in this example, but other shapes are also possible (e.g. circular profile).

Each of the first, second and third screens 408, 410 and 412 has a respective frame (not shown) and a respective mesh 434, 436 and 438 covering the frame. The frames are shaped for mounting the first, second and third screens 408, 410 and 412 on the first, second and third chassis 402, 404 and 406 respectively. The frames also have openings (not shown) that are aligned with the chassis 402, 404 and 406. The mesh 434 of the first screen 406 may have the largest mesh size, and the third screen 412 may have the smallest mesh size.

Figure 28:
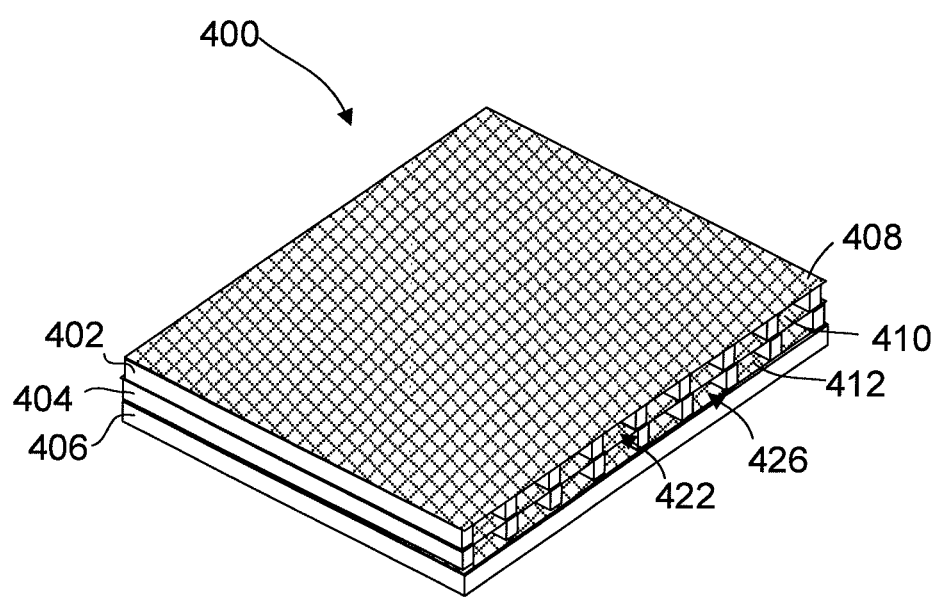
FIG. 28 is perspective view of stacked screen assembly of FIG. 27, as assembled.

FIG. 28 shows the assembled stacked screen assembly 400, with the following components in order from the top: first screen 408, first chassis 402, second screen 410, second chassis 404, third screen 412, and third chassis 406. Any suitable fastening means (e.g. bolts, screws, rivets, welding, adhesives, etc.) may be used to connect the screens (408, 410, 412) and the chassis (402, 404, 406) together.

In use, solution (e.g. slurry) of mixed solids and liquid may fall on the screen in a vibrating machine. The largest solids may be caught by the first screen 408, with remaining solids and liquid may flow down through the channels 414 (shown in FIG. 27) of the first chassis 402 and onto the second screen 410. The second screen may filter medium sized solids, which may then travel through the channels 414 and exit through the open side 422 of the first chassis 402. The remaining solids that are not filtered out by the second screen 410 and the liquid may pass through the second screen 410 and onto the third screen 412. The third screen 412 may then filter out smaller solid solids, which will then exit via the open side 426 of the second chassis 404. Finally, the liquid and solids small enough to pass through the mesh 438 of the third screen 412 may exit through the channels 426 (shown in FIG. 27) of the third chassis 406.

In some embodiments, a fourth screen (not shown) could be placed on a bottom face of the third chassis 406. In such embodiments, the third chassis could be modified to include an open side, similar to the first and second chassis 402 and 404 to allow screened solids to exit through the open side.

The stacking pattern shown in FIGS. 27 and 28 could include additional chassis and/or screens. Stacked screen assemblies are not limited to three chassis and three screens, and more or fewer chassis and screens may be used in other embodiments. In addition, a chassis with channels (such as first chassis 402 shown in FIG. 27) may be used in the single and/or dual screen models described above with reference to FIGS. 1 to 27. Conversely, a stacked screen assembly could use one or more chassis with a grid structure (such as the chassis 102 shown in FIG. 3, or the chassis 302 shown in FIGS. 16 and 17). Other chassis arrangements may also be used.

A stacked configuration (such as the embodiment of FIGS. 27 and 28) may be used for situations where solids (such as particles) are to be separated in two or more different sizes. The stacking shown in FIGS. 27 and 28 may also be repeated with additional screens and/or chassis as needed to provide the desired number of different separations.

Some embodiments of the screen assemblies described herein may be relatively lightweight and/or stiff, which may result in the screen being more wear resistant (resulting in increased longevity) compared to conventional screen assemblies. For example, the screen assembly of some embodiments may be less prone to center-screen vibrations at frequencies and/or amplitudes higher than the vibrating frequency of the machine. In order to compensate for typical wear and damage problems, some conventional screen assemblies may be rotated up to 90 degrees to the direction of material flow. One or more embodiments described herein may avoid the need for such rotation to reduce wear or increase the lifetime of the screen assembly compared to conventional screen assemblies. Some embodiments of the screen assemblies described herein may be cost effective to manufacture. Some embodiments may by recyclable. For example, the mechanical attachment means for attaching the screen(s) to the chassis may allow the screen and chassis to be separated for recycling purposes and/or to be reused with a new screen(s).

Figure 29:
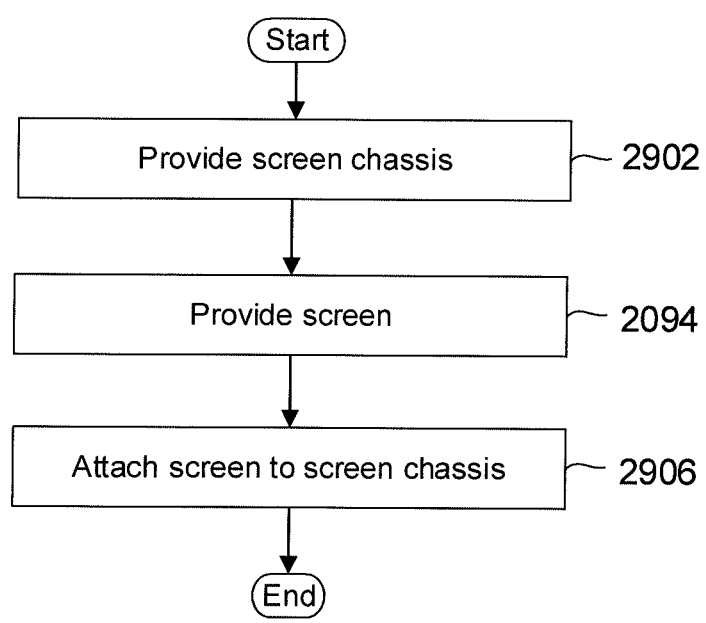
FIG. 29 is a flowchart of a method accordance to some embodiments.

Some embodiments of the disclosure provide a method for producing a screen assembly (such as the example assemblies described above). FIG. 29 is a flowchart of an example method according to some embodiments. At block 2902, a screen chassis is provided. The screen chassis comprises a first face and a second face opposite to the first face, the screen chassis defining a plurality of openings therethrough from the first face to the second face for allowing passage of a screened material. The screen chassis may, for example, be in the form of any example chassis described above (e.g. chassis 102, 202, 302, 402, 404 or 406 shown in FIGS. 3, 10, 17, 18 27 and 28). At block 2904, a screen is provided. The screen may be formed of metal as described above. The screen includes a frame and a mesh, the frame comprising a plurality of openings that are aligned with the openings of the screen chassis, and the mesh covering the openings of the frame. The screen may, for example, be in the form of any of the example metal screens described above (e.g. metal screens 104, 107, 204, 205, 304, 408, 410 or 412 shown in FIGS. 1, 2, 9, 10, 11, 15, 16, 21, 22, 27 and 28). At block 2906, the screen is attached to the screen assembly such that the metal screen covers the openings in the screen chassis. The screen may be attached in any suitable manner described above.

Providing the screen chassis may include manufacturing, purchasing, or otherwise obtaining the screen chassis. The screen chassis may be molded from a lightweight, stiff material including, but not limited to plastic.

Providing the screen may include manufacturing, purchasing, or otherwise obtaining the screen. For example, the screen may be at least partially manufactured from sheet metal (e.g. using a sheet metal punching process) as described above. More particularly, the screen may include a frame and/or perforated plate that is formed by a sheet metal punching process The method may further include providing and/or attaching a second screen to the screen chassis on a face of the screen chassis that is opposite from the first metal screen. The attaching may be accomplished by any suitable means, as described above. The second screen may be attached to the second face of the screen chassis such that the screen covers the openings in the screen chassis at the second face.

In some aspects, any of the screen chassis described above may be provided separately from the metal screen. For example, some embodiments provide a screen chassis for attaching to a metal screen for use in a vibratory screen machine. The screen chassis may, for example, be in the form of any of the chassis 102, 202, 302, 402, 404 or 406 shown in FIGS. 3, 10, 17, 18 27 and 28.

In some aspects, any of the metal screens and/or metal frames discussed above may be provided separate from the screen chassis. In some embodiments, there is provided a metal screen for attaching to and at least partially covering a screen chassis for use in a vibratory screen machine, the metal screen may, for example, be in the form of any of the metal screens 104, 107, 204, 205, 304, 408, 410 or 412 shown in FIGS. 1, 2, 9, 10, 11, 15, 16, 21, 22, 27 and 28.

In some embodiments, the metal screen(s) may be removable from the chassis such that multiple screens may be swapped or replaced as needed, while still using the same screen chassis. Similarly, the chassis may be replaceable. For example, removable attachment means such as screws or bolts could be used to facilitate screen replacement. This capability may not be provided by conventional screens. In some dual screen embodiments, the screen on a top face of a chassis may include a relatively durable perforated plate and/or mesh material for screening the material. Such durable perforated plates or mesh materials may outlast the lower screen material and possibly the screen chassis itself. The top screen comprising the more durable (and possibly expensive) material could then be used with a replacement screen chassis and/or lower screen. Some perforated plates can cost several thousand dollars and some screen treating materials (e.g. DLC and ion nitriding) may also be expensive. Thus, the reusable, and recyclable nature of the screen assemblies described herein could reduce the cost of using such expensive materials since the expensive components may be reused when other less expensive components wear out.

It is to be understood that a combination of more than one of the above approaches may be implemented in some embodiments. Embodiments are not limited to any particular one or more of the approaches, methods or apparatuses disclosed herein. One skilled in the art will appreciate that variations, alterations of the embodiments described herein may be made in various implementations without departing from the scope thereof. It is therefore to be understood that within the scope of the appended claims, the disclosure may be practiced otherwise than as specifically described herein.

What has been described is merely illustrative of the application of the principles of the invention. Other arrangements and methods can be implemented by those skilled in the art without departing from the scope of the present invention.

The invention claimed is:

1. A screen assembly for a vibrating screening machine, the screen assembly comprising:
    a screen chassis comprising a first face and a second face opposite to the first face, the screen chassis defining a plurality of openings therethrough from the first face to the second face for allowing passage of a material that has been screened;
    a first screen for screening the material, the screen being attached to the first face of the screen chassis and covering the openings of the screen chassis at the first face; and
    a second screen for screening the material, the second screen being attached to the second face of the screen chassis and covering the openings of the screen chassis at the second face;
    wherein the first screen has a first mesh size or perforation size, and the second screen has a second mesh size or perforation size.

2. The screen assembly of claim 1, wherein at least one of the first or second screen comprises a perforated plate.

3. The screen assembly of claim 2, wherein the perforated plate is formed from sheet metal.

4. The screen assembly of claim 1, wherein at least one of the first or second screen comprises a frame and a screening layer, the frame defining at least one opening, the at least one opening at least partially overlaying the openings of the screen chassis, the frame being attached to the screen chassis, the screening layer covering the at least one opening of the frame.

5. The screen assembly of claim 4, wherein the screening layer comprises a mesh.

6. The screen assembly of claim 4, wherein the at least one opening of the frame comprises a plurality of openings that are aligned with the openings of the screen chassis.

7. The screen assembly of claim 4, wherein the screen comprises metal.

8. The screen assembly of claim 7, wherein the frame is formed from sheet metal.

9. The screen assembly of claim 1, wherein the screen chassis comprises one or more of: plastic; aluminum; steel; and a composite material.

10. The screen assembly of claim 1, wherein the screen chassis is formed by a molding process.

11. The screen assembly of claim 1, wherein the first face of the screen chassis faces substantially upward when the screen assembly is mounted in the vibratory screening machine.

12. The screen assembly of claim 1, wherein the screen chassis comprises a grid structure defining the plurality of openings in the screen chassis.

13. The screen assembly of claim 12, wherein the grid structure of the screen chassis comprises a plurality of ribs parallel to the first and second faces, and a plurality of cross ribs parallel to the first and second faces and perpendicular to the ribs.

14. The screen assembly of claim 13, wherein one or more of the ribs or cross ribs extend between the first face and the second face of the screen chassis.

15. The screen assembly of claim 14, wherein one or more of the ribs and cross ribs extend only part way from the first face of the screen chassis toward the second face.

16. The screen assembly of claim 13, wherein screen comprises a frame and the frame of the screen comprises a grid structure that is aligned with the grid structure of the screen chassis.

17. The screen assembly of claim 15,
    wherein
    the one or more of the ribs and cross ribs extending only part way from the first face of the screen chassis toward the second face allow passage thereunder of solids caught by the second screen, and
    the one or more of the ribs or cross ribs extending between the first face and the second face of the screen chassis form channels therebetween for passage of the solids caught by the second screen.

18. The screen assembly of claim 1, wherein the first mesh size or perforation size is different than the second mesh size or perforation size.

19. The screen assembly of claim 18, wherein the first mesh size or perforation size is larger than the second mesh size or perforation size.

20. The screen assembly of claim 1, wherein at least one of the first or second screen is removably attached to the screen chassis such that the screen or the screen chassis is replaceable.

21. The screen assembly of claim 1, the screen chassis being a first screen chassis, and the screen assembly further comprising at least one additional screen chassis having openings therethrough, the first screen chassis and the at least one additional screen chassis being in a stacked formation with the openings of the first screen chassis being aligned with the openings of the at least one additional screen chassis,
    the screen assembly further comprising, for each pair of adjacent screen chassis, a respective additional screen, for screening the material, between the pair of adjacent screen chassis.

22. A screen assembly for a vibrating screening machine, the screen assembly comprising:
- a screen chassis comprising a first face and a second face opposite to the first face, the screen chassis defining a plurality of openings therethrough from the first face to the second face for allowing passage of a material that has been screened;
- a first screen for screening the material, the screen being attached to the first face of the screen chassis and covering the openings of the screen chassis at the first face; and
- a second screen for screening the material, the second screen being attached to the second face of the screen chassis and covering the openings of the screen chassis at the second face;
- wherein the second screen comprises a frame defining at least one opening; and a mesh covering the at least one opening of the frame.

23. A screen assembly for a vibrating screening machine, the screen assembly comprising:
- a screen chassis comprising a first face and a second face opposite to the first face, the screen chassis defining a plurality of openings therethrough from the first face to the second face for allowing passage of a material that has been screened;
- a first screen for screening the material, the screen being attached to the first face of the screen chassis and covering the openings of the screen chassis at the first face; and
- a second screen for screening the material, the second screen being attached to the second face of the screen chassis and covering the openings of the screen chassis at the second face;
- wherein the screen chassis defines a plurality of channels allowing solids caught by the second screen to move through the channels.

24. The screen assembly of claim 23, further comprising at least one open side allowing said solids caught by the second screen to exit from of the at least one open side.

25. A screen assembly for a vibrating screening machine, the screen assembly comprising:
- a screen chassis comprising a first face and a second face opposite to the first face, the screen chassis defining a plurality of openings therethrough from the first face to the second face for allowing passage of a material that has been screened;
- a first screen for screening the material, the screen being attached to the first face of the screen chassis and covering the openings of the screen chassis at the first face; and
- a second screen for screening the material, the second screen being attached to the second face of the screen chassis and covering the openings of the screen chassis at the second face;
- wherein the second screen is removably attached to the screen chassis such that the screen assembly has a single screen configuration in which the second screen is not attached to the screen assembly, and a dual screen configuration in which the second screen is attached to the screen assembly.

26. A screen assembly for a vibrating screening machine, the screen assembly comprising:
- a screen chassis comprising a first face and a second face opposite to the first face, the screen chassis defining a plurality of openings therethrough from the first face to the second face for allowing passage of a material that has been screened;
- a first screen for screening the material, the screen being attached to the first face of the screen chassis and covering the openings of the screen chassis at the first face; and
- a second screen that is removably attachable to the second face of the screen chassis such that the second screen covers the openings of the screen chassis at the second face and such that the screen assembly has a single screen configuration in which the second screen is not attached to the screen assembly, and a dual screen configuration in which the second screen is attached to the screen assembly.

27. A screen assembly for a vibrating screening machine, the screen assembly comprising:
- a screen chassis comprising a first face and a second face opposite to the first face, the screen chassis defining a plurality of openings therethrough from the first face to the second face for allowing passage of a material that has been screened;
- a screen for screening the material, the screen being attached to the first face of the screen chassis and covering the openings of the screen chassis at the first face; and
- a frame attached to the second face of the screen chassis, the frame attached to the second face defining at least one opening at least partially overlaying the openings of the screen chassis at the second face.

* * * * *